US010414668B1

(12) United States Patent
Vaia et al.

(10) Patent No.: US 10,414,668 B1
(45) Date of Patent: Sep. 17, 2019

(54) EXFOLIATING LAYERED TRANSITION METAL DICHALCOGENIDES

(71) Applicant: Government of the United States, as represented by the Secretary of the Air Force, Wright-Patterson AFB, OH (US)

(72) Inventors: Richard A. Vaia, Beavercreek, OH (US); Ali M. Jawaid, Fairborn, OH (US)

(73) Assignee: United States of America as represented by the Secretary of the Air Force, Wright Patterson AFB, OH (US)

(*) Notice: Subject to any disclaimer, the term of this patent is extended or adjusted under 35 U.S.C. 154(b) by 4 days.

(21) Appl. No.: 15/953,637

(22) Filed: Apr. 16, 2018

Related U.S. Application Data

(60) Provisional application No. 62/590,689, filed on Nov. 27, 2017.

(51) Int. Cl.
 C01G 39/06 (2006.01)
 C01G 47/00 (2006.01)
 C01B 19/04 (2006.01)
(52) U.S. Cl.
 CPC .......... C01G 39/06 (2013.01); C01B 19/04 (2013.01); C01G 47/00 (2013.01)
(58) Field of Classification Search
 None
 See application file for complete search history.

(56) References Cited

U.S. PATENT DOCUMENTS

| 4,822,590 A | 4/1989 | Morrison et al. |
| 4,853,359 A | 8/1989 | Morrison et al. |

(Continued)

FOREIGN PATENT DOCUMENTS

| CA | 2069266 A1 | 11/1992 |
| WO | 2012101457 A1 | 8/2012 |

(Continued)

OTHER PUBLICATIONS

Jawaid, A., et al., "Mechanism for Liquid Phase Exfoliation of MoS2," Chem. Mater., 2016, 28, 337-349, Dec. 17, 2015.

(Continued)

*Primary Examiner* — Sheng H Davis
(74) *Attorney, Agent, or Firm* — AFMCLO/JAZ; Timothy M. Barlow

(57) ABSTRACT

A technique for exfoliating a transition metal dichalcogenide material to produce separated nano-scale platelets includes combining the transition metal dichalcogenide material with a liquid to form a slurry, wherein the transition metal dichalcogenide material includes layers of nano-scale platelets and has a general chemical formula $MX_2$, and wherein M is a transition metal and X is sulfur, selenium, or tellurium. The slurry of the transition metal dichalcogenide material is treated with an oxidant to form peroxo-metalate intermediates on an edge region of the layers of nano-scale platelets of the transition metal dichalcogenide material. The peroxo-metalate intermediates is treated with a reducing agent to form negatively charged poly-oxo-metalates to induce separation of the transition metal dichalcogenide material into the separated nano-scale platelets of the transition metal dichalcogenide material.

10 Claims, 15 Drawing Sheets

(56) References Cited

U.S. PATENT DOCUMENTS

| | | | |
|---|---|---|---|
| 5,279,720 | A | 1/1994 | Divigalpitiya |
| 7,785,492 | B1 | 8/2010 | Jang et al. |
| 7,824,651 | B2 | 11/2010 | Zhamu et al. |
| 8,114,373 | B2 | 2/2012 | Jang et al. |
| 9,718,972 | B2 | 8/2017 | Torrisi et al. |
| 2003/0224168 | A1 | 12/2003 | Mack et al. |
| 2004/0033189 | A1 | 2/2004 | Kaschak et al. |
| 2008/0048152 | A1 | 2/2008 | Jang et al. |
| 2011/0057156 | A1 | 3/2011 | Schaumburg |
| 2012/0021293 | A1 | 1/2012 | Zhamu et al. |
| 2014/0370269 | A1 | 12/2014 | Kinloch et al. |
| 2015/0004733 | A1 | 1/2015 | Wang et al. |
| 2017/0101428 | A1 | 4/2017 | Wang et al. |

FOREIGN PATENT DOCUMENTS

| | | | |
|---|---|---|---|
| WO | 2015147937 | A2 | 10/2015 |
| WO | 2017093321 | A1 | 6/2017 |
| WO | 2017158334 | A1 | 9/2017 |

OTHER PUBLICATIONS

Cunningham, G., et al., "Solvent Exfoliation of Transition Metal Dichalcogenides: Dispersibility of Exfoliated Nanosheets Varies Only Weakly between Compounds," ACS Nano, 6 (4), pp. 3468-3480, Mar. 6, 2012.

Eda, G., et al., "Photoluminescence from chemically exfoliated $MoS_2$," Nano Lett., 2011, 11 (12), pp. 5111-5116, Dec. 31, 2011.

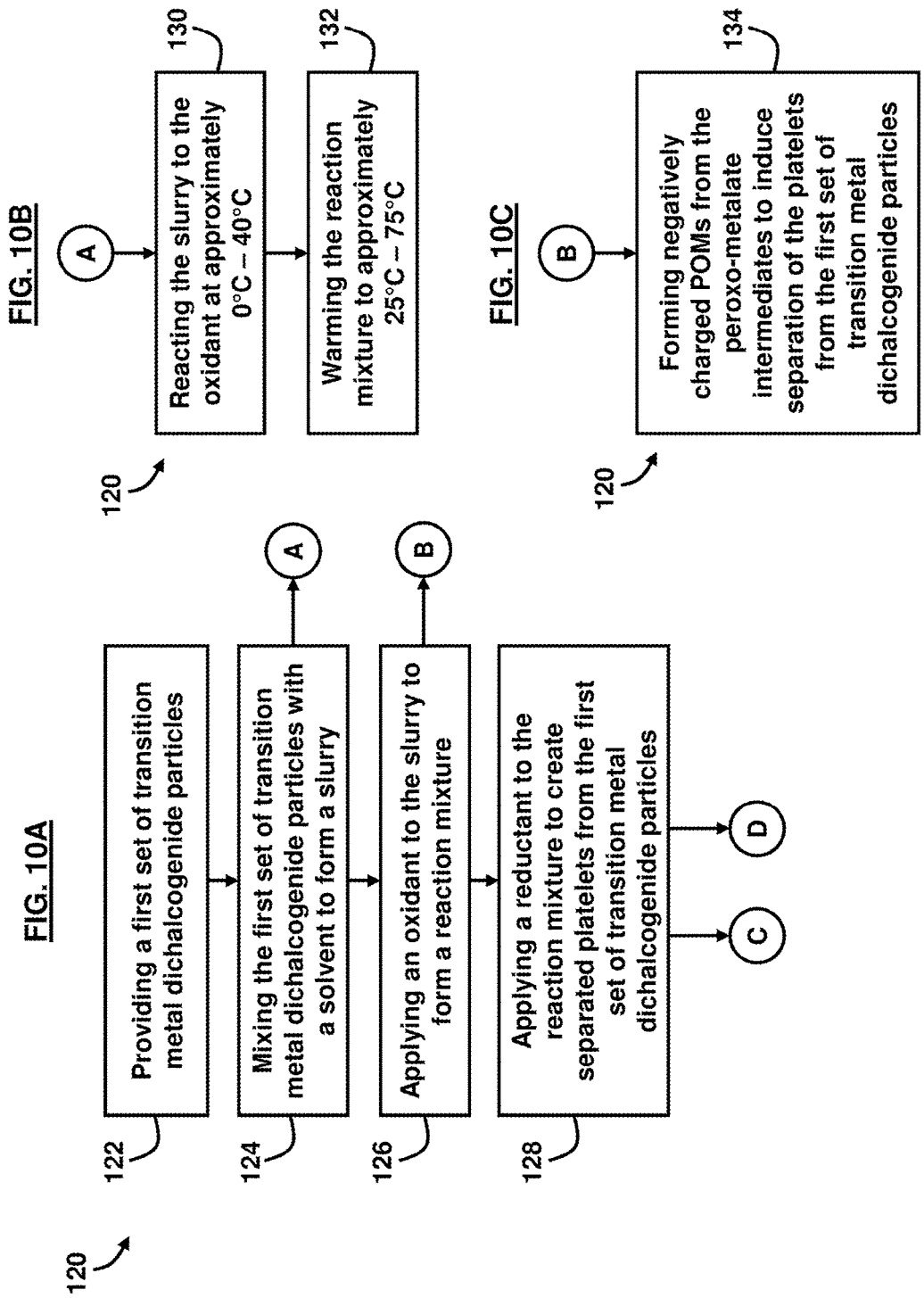

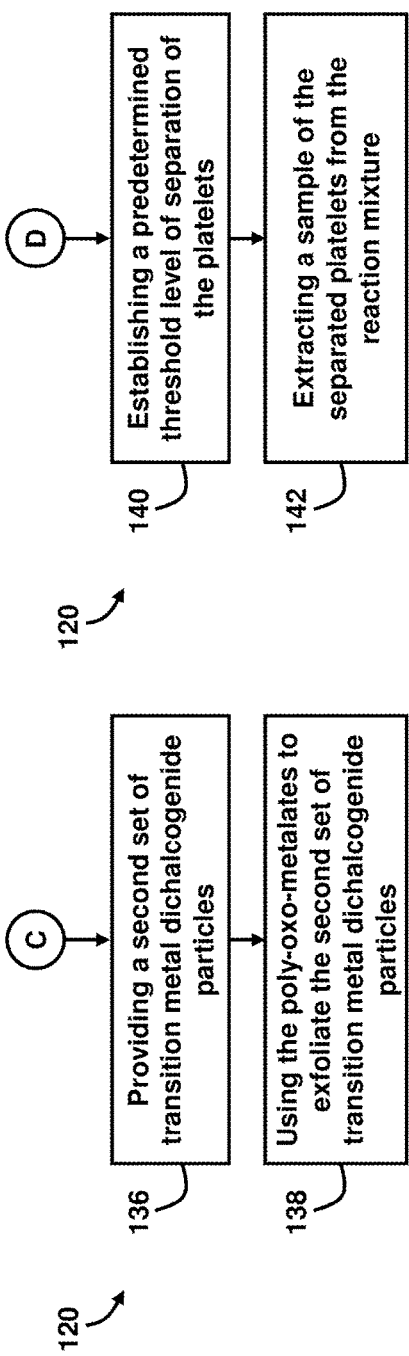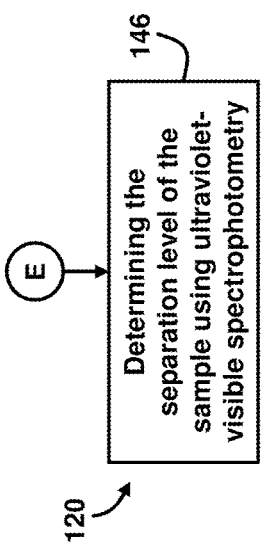
FIG. 10E
FIG. 10D
FIG. 10F

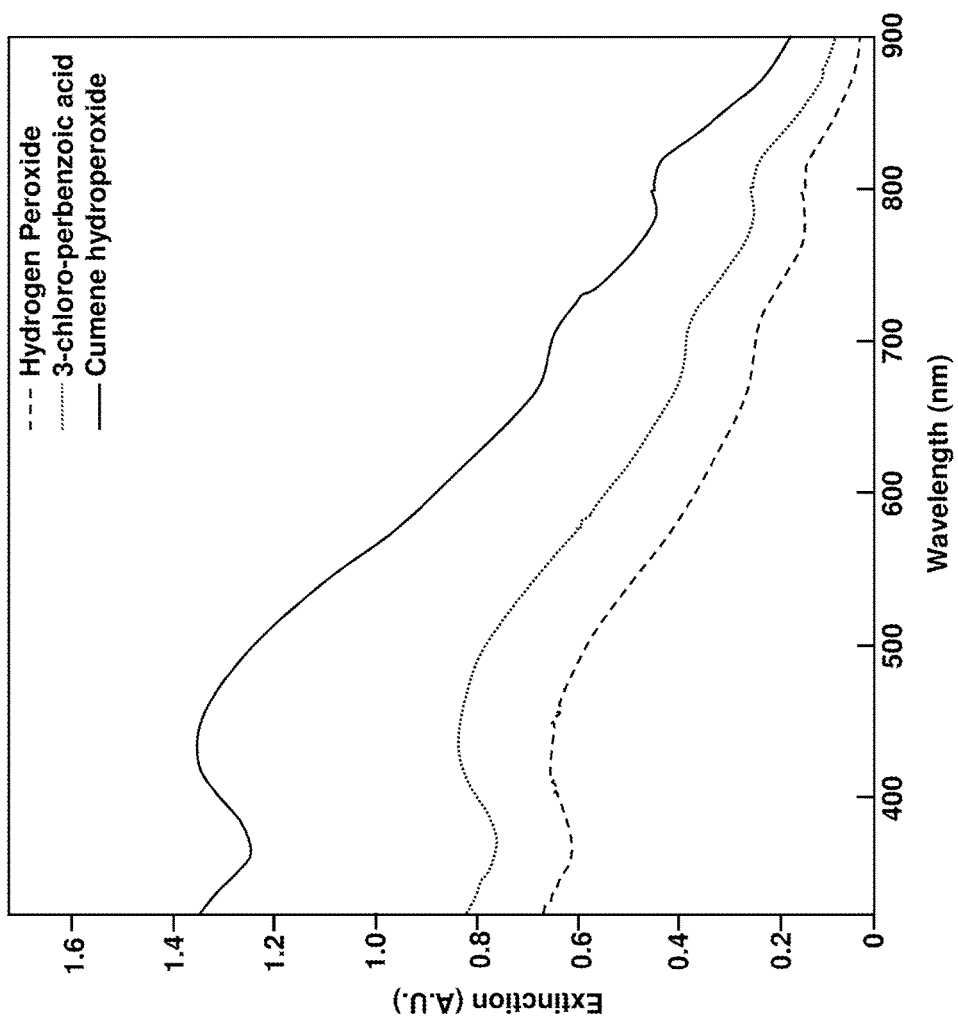

EXFOLIATING LAYERED TRANSITION METAL DICHALCOGENIDES

CROSS-REFERENCE TO RELATED APPLICATION(S)

This application claims the benefit of U.S. Provisional Patent Application No. 62/590,689 filed on Nov. 27, 2017, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to exfoliating layered materials, and more particularly to exfoliating transition metal dichalcogenides.

Background of the Invention

Layered transition metal dichalcogenides (TMDs) are an emerging class of two-dimensional materials due to their diverse properties, which ranges from semiconducting and semi-metallic to metallic and superconducting. Their lamellar structure includes a transition metal layer (M) sandwiched between two chalcogen layers (X) with strong M-X intralayer bonding. These layers are separated by a weak van der Waals gap. At the few-layer to monolayer limit, coupling between layers is reduced, in-plane confinement dominates, and the band structure changes. This affords opportunities for chemical sensing, catalysis, spintronics, single-photon emission, infrared optics, nanocomposites, coatings, and printable inks for nanoelectronics. Thus, a suite of processing methods has evolved to satisfy application-specific requirements, such as defect density, scale, cost, and integration.

Traditional chemical exfoliation strategies exploit the ability of the interlayer gap to accommodate uncharged polar molecules or cationic guest species. Intercalate mobility, however, depends on the electronic structure of the layered TMD, requiring strong alkali earth or organometallic species for effective penetration. Thus, these processes require inert atmosphere and additional engineering controls to accommodate the reactivity of the intercalants. Further, due to phase changes during guest intercalation (i.e., semiconducting 2H to metallic 1T), additional restorative annealing steps are often required after exfoliation to generate single domain materials.

Top-down exfoliation of TMD powders affords large volume use and complements molecular-based monolayer growth for microfabricated devices. Although various methods for solution exfoliation of powders have been developed, challenges remain. For example, reproducibility, scale-up, and efficiency of the exfoliation of TMDs are often less than desired. Accordingly, there is a need for new methods for exfoliating TMD powders to form nano-platelets of the TMDs.

BRIEF SUMMARY OF THE INVENTION

In view of the foregoing, an embodiment herein provides an apparatus comprising a vessel containing a slurry comprising a solvent and a transition metal dichalcogenide material comprising layers of nano-scale platelets and having a general chemical formula $MX_2$, and wherein M is a transition metal and X is sulfur, selenium, or tellurium; a first applicator to introduce an oxidant into the vessel, wherein a reaction of the oxidant with the slurry forms peroxo-metalate intermediates on an edge region of the layers of nano-scale platelets; and a second applicator to introduce a reducing agent into the vessel, wherein a reaction of the reducing agent with the peroxo-metalate intermediates forms negatively-charged poly-oxo-metalates to induce separation of the transition metal dichalcogenide material into separated nano-scale platelets. The transition metal may comprise any of titanium, zirconium, hafnium, vanadium, niobium, tantalum, molybdenum, tungsten, rhenium, nickel, palladium, platinum, copper, silver, and gold. The apparatus may comprise a first device to agitate the slurry; and a second device to isolate the separated nano-scale platelets.

Another embodiment provides a method of exfoliating a transition metal dichalcogenide material to produce separated nano-scale platelets, the method comprising combining the transition metal dichalcogenide material with a liquid to form a slurry, wherein the transition metal dichalcogenide material comprises layers of nano-scale platelets and has a general chemical formula $MX_2$, and wherein M is a transition metal and X is sulfur, selenium, or tellurium; treating the slurry of the transition metal dichalcogenide material with an oxidant to form peroxo-metalate intermediates on an edge region of the layers of nano-scale platelets of the transition metal dichalcogenide material; and treating the peroxo-metalate intermediates with a reducing agent to form negatively-charged poly-oxo-metalates to induce separation of the transition metal dichalcogenide material into the separated nano-scale platelets of the transition metal dichalcogenide material.

The transition metal may comprise any of titanium, zirconium, hafnium, vanadium, niobium, tantalum, molybdenum, tungsten, rhenium, nickel, palladium, platinum, copper, silver, and gold, wherein the chalcogenide comprises any of sulfur, selenium, and tellurium. The method may comprise agitating the slurry by any of stirring and ultrasonicating. The liquid may comprise an organic solvent selected from the group consisting of a polar protic solvent, a polar aprotic solvent, and combinations thereof. The organic solvent may be selected from the group consisting of acetonitrile, methanol, ethanol, acetone, methyl ethyl ketone, N,Ndimethylformamide, N-methylpyrrolidone, and combinations thereof. The reducing agent may comprise any of a hydride donor and an electron transfer species. The hydride donor may comprise any of sodium borohydride and lithium borohyride, and the electron transfer species may comprise any of ascorbic acid and hydroquinone. The oxidant may comprise any of peroxide and peroxo-acid. The peroxide may comprise any of cumene hydroperoxide, hydrogen peroxide, and 3-chloroperbenzoic acid. The method may comprise isolating the separated nano-scale platelets of the transition metal dichalcogenide material by any of decantation, centrifugation, and filtration.

Another embodiment provides a method comprising providing a first set of transition metal dichalcogenide particles comprising a stack of at least nano-scale size platelets having a chemical formula of $MX_2$, wherein M is a transition metal and X is sulfur, selenium, or tellurium; mixing the first set of transition metal dichalcogenide particles with a solvent to form a slurry; applying an oxidant to the slurry to form a reaction mixture comprising peroxo-metalate intermediates on the at least nano-scale size platelets; and applying a reductant to the reaction mixture to create separated at least nano-scale size platelets from the first set of transition metal dichalcogenide particles. The transition metal may comprise any of titanium, zirconium, hafnium, vanadium, niobium, tantalum, molybdenum, tungsten, rhenium, nickel, palladium, platinum, copper, silver, and gold.

The oxidant may comprise any of organic hydroperoxides (R—O—O—H) and organic peroxo-acids (R—C—O$_2$—O—H, and wherein R and R' are substituted or unsubstituted carbon-containing groups. A molar ratio of the oxidant to the transition metal dichalcogenide particles may be in the range of approximately 1:10 to 10:1. Optimal ratios of oxidant to TMD (mol:mol) are typically between 1:1 and 2:1. Ratios between 3:1 and 10:1 were not shown to increase exfoliation yields, but beyond 10:1 there is no exfoliation. The method may comprise reacting the slurry to the oxidant at approximately 0° C.-40° C.; and warming the reaction mixture to approximately 25° C.-75° C. Optimal temperatures for reacting the slurry with the oxidant and the later warming step may vary between systems. For most oxidations, there is a critical threshold temperature where if the slurry is raised above that temperature (for a 1:1 oxidant:TMD ratio), the polyoxometalates do not form and no exfoliation is achieved; temperatures below that threshold are suitable. For $MoS_2$, $MoSe_2$, and $MoTe_2$, that temperature threshold is 45 Celsius. Accordingly, one preferred temperature range for oxidation is between 37-40° C. However, some TMD systems still provide excellent yields when oxidized at elevated temperatures (i.e. $ZrTe_2$, oxidation @ 70° C., 24 hrs). The method may comprise forming negatively-charged poly-oxo-metalates from the peroxo-metalate intermediates to induce separation of the nano-scale size platelets from the first set of transition metal dichalcogenide particles. The method may comprise providing a second set of transition metal dichalcogenide particles; and using the poly-oxo-metalates to exfoliate the second set of transition metal dichalcogenide particles. The method may further comprise establishing a predetermined threshold level of separation of the platelets; extracting a sample of the separated platelets from the reaction mixture; and comparing the separation level of the sample with the predetermined threshold level. The method may further comprise determining the separation level of the sample using ultraviolet-visible spectrophotometry.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 10A is a flow diagram illustrating a method of separating platelets, according to an embodiment herein;

FIG. 10B is a flow diagram illustrating a method of reacting the slurry to the oxidant and warming the reaction mixture of the method of FIG. 10A, according to an embodiment herein;

FIG. 10C is a flow diagram illustrating a method of inducing separation of the platelets of the method of FIG. 10A, according to an embodiment herein;

FIG. 10D is a flow diagram illustrating a method of further exfoliation of TMD particles based on the method of FIG. 10A, according to an embodiment herein;

FIG. 10E is a flow diagram illustrating a method of monitoring an efficiency of the separation method of FIG. 10A, according to an embodiment herein;

FIG. 10F is a flow diagram illustrating a method of determining the separation of the sample provided in the method of FIG. 10E, according to an embodiment herein;

FIG. 12 illustrates another UV-Vis extinction spectra for slurries containing different reductants, according to an embodiment herein.

DETAILED DESCRIPTION OF THE INVENTION

Figure 1A:
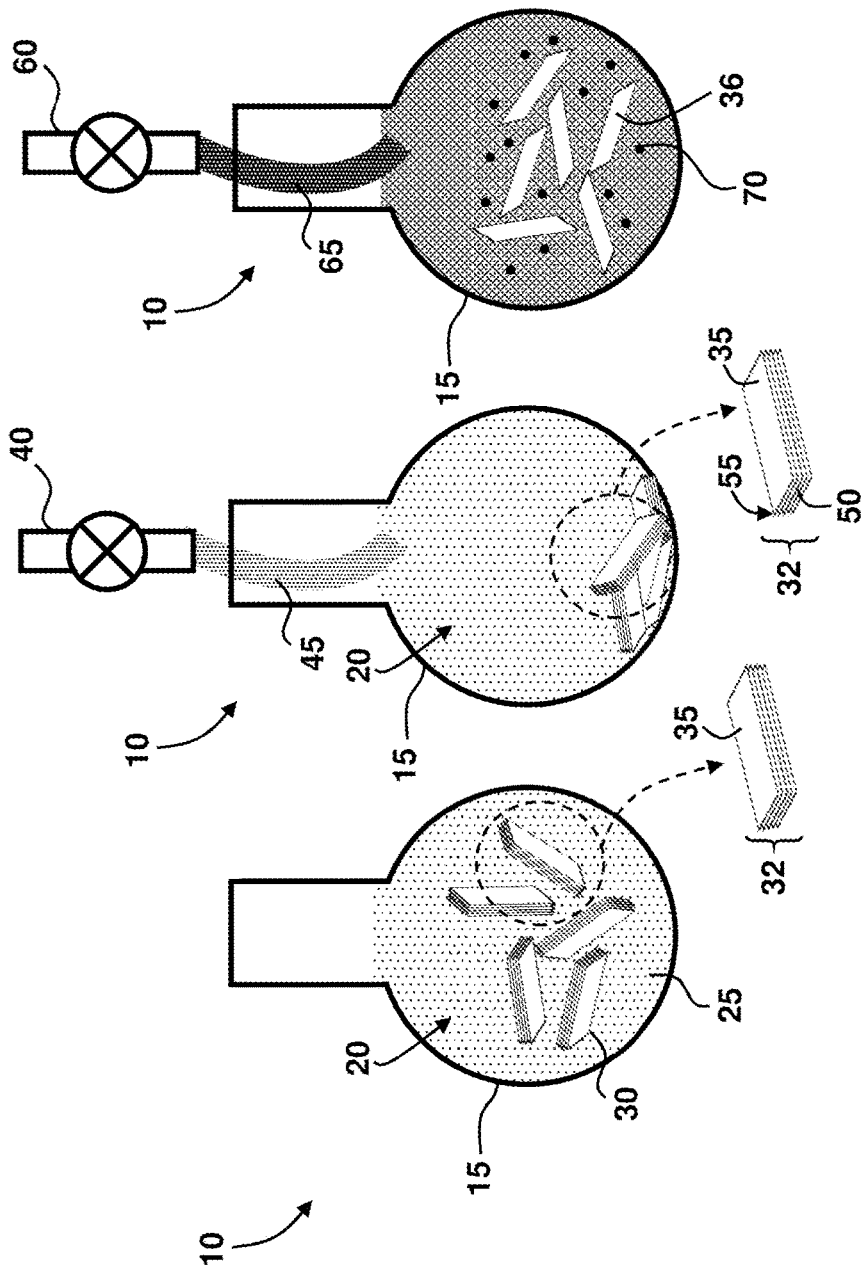
FIG. 1A is a schematic diagram illustrating an apparatus for forming transition metal dichalcogenides (TMDs), according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

In the drawings, the size and relative sizes of layers and regions may be exaggerated for clarity. The embodiments herein provide a technique for exfoliating a transition metal dichalcogenide material to produce separated nano-scale platelets. The technique includes (a) combining the transition metal dichalcogenide material with a liquid to form a slurry, wherein the transition metal dichalcogenide material comprises layers of nano-scale platelets and has a general chemical formula $MX_2$, wherein M is a transition metal and X is sulfur, selenium, or tellurium; (b) treating the slurry of the transition metal dichalcogenide material with an oxidant to form peroxo-metalate intermediates on an edge portion of the layers of nano-scale platelets of the transition metal dichalcogenide material; and (c) treating the peroxo-metalate intermediates with a reducing agent to form negatively charged poly-oxo-metalates, which induces separation of the transition metal dichalcogenide material into the separated nano-scale platelets of the transition metal dichalcogenide material. The embodiments herein use oxidation chemistry to form poly-oxo-metalates (POMs) in-situ and then subsequently adjusting charge by the addition of a reducing agent to drive layer separation via electrostatics without the need for acoustic energy. The embodiments herein use mild oxidants (such as cumene hydroperoxide, for example) to generate the peroxo-metalate intermediate precursors from the TMDs. These form the anionic POMs in-situ, which adsorb to the surface of the TMD and result in exfoliation. In an example, $MoS_2$ dispersions of monolayer-sized flakes at concentrations up to 3 mg/ml are formed quiescently in both protic (e.g., ethanol, methanol) and aprotic solvents (e.g., acetonitrile, acetone). Furthermore, the technique provided by the embodiments herein offers a low-cost, low-energy, comprehensive framework for exfoliation of layered TMDs from Groups IV, V, VI, and VII. Referring now to the drawings, and more particularly to FIGS. 1A through 12, where similar reference characters denote corresponding features consistently throughout, there are shown exemplary embodiments.

FIG. 1A illustrates an apparatus 10 comprising a vessel 15 containing a slurry 20 comprising a solvent 25 and a transition metal dichalcogenide (TMD) material 30 comprising layers 32 of nano-scale platelets 35 and having a general chemical formula $MX_2$, wherein M is a transition metal and X is sulfur, selenium, or tellurium. A first applicator 40 is provided to introduce an oxidant 45 into the vessel 15, wherein a reaction of the oxidant 45 with the slurry 20 forms peroxo-metalate intermediates 50 on an edge region 55 of the layers 32 of nano-scale platelets 35. The first applicator 40 may be any suitable device used to control the flow of the oxidant 45 into the vessel 15. A second applicator 60 is provided to introduce a reducing agent 65 into the vessel 15, wherein a reaction of the reducing agent 65 with the peroxo-metalate intermediates 50 forms negatively charged poly-oxo-metalates (POM) 70 to induce separation of the TMD material 30 into separated nano-scale platelets 36. The second applicator 60 may be any suitable device used to control the flow of the reducing agent 65 into the vessel 15. In various examples, the transition metal may comprise any of titanium, zirconium, hafnium, vanadium, niobium, tantalum, molybdenum, tungsten, rhenium, nickel, palladium, platinum, copper, silver, and gold.

Figure 1B:
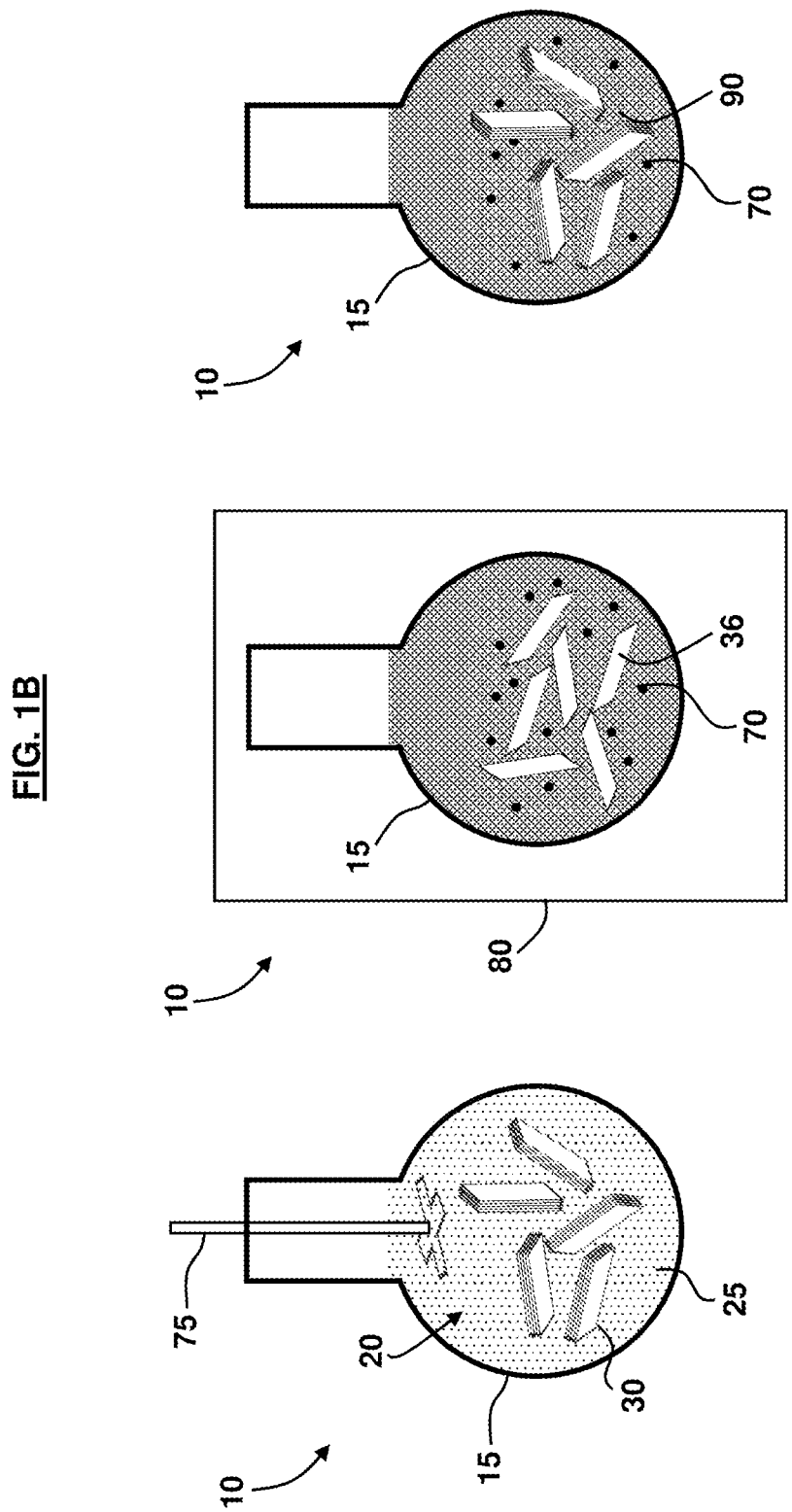
FIG. 1B is a schematic diagram illustrating another aspect of the apparatus of FIG. 1A, according to an embodiment herein.

As shown in FIG. 1B, with reference to FIG. 1A, the apparatus 10 may comprise a first device 75 to agitate the slurry 20. In some examples, the first device 75 may comprise a mixer, a stirrer, an ultrasonicator, or any other type of device that can agitate the slurry 20. A second device 80 may be provided to isolate the separated nano-scale platelets 35. In an example, the second device 80 may comprise a centrifuge. In another example, a second set of transition metal dichalcogenide particles 90 are provided in the vessel 15, and the poly-oxo-metalates 70 are used to exfoliate the second set of transition metal dichalcogenide particles 90.

Table 1 provides a list of example TMD materials 30 along with the oxidizing and reducing conditions that generate the exfoliated (e.g., separated) nano-scale platelets 36. In an example, the oxidant 45 may comprise cumene hydroperoxide, and the reducing agent 65 may comprise $NaBH_4$.

TABLE 1

Example TMDs and Oxidizing/Reducing Conditions

| TMD | Temp. of oxidation (° C.) | Time for oxidation reaction (hours) | Color indication for oxidation | Temp. of reduction (° C.) | Time for reduction (hours) | Color indication for reduction |
|---|---|---|---|---|---|---|
| $MoS_2$ | 35 | 1 | Yellow | 0 | 3 | Green |
| $MoSe_2$ | 45 | 24 | Orange | 0 | 24 | Dull red |
| $MoTe_2$ | 45 | 24 | Light yellow | 0 | 24 | Olive green |
| $WS_2$ | 50 | 48 | Very light yellow | 0 | 48 | Dark green |
| $WSe_2$ | 50 | 24 | Orange | 0 | 48 | Red |
| $WTe_2$ | 25 | 24 | Dark yellow | 25 | 24 | Black |
| $ReS_2$ | 60 | 1 | Dark yellow | 0 | 3 | Deep red |
| $NbS_2$ | 35 | 24 | No indication | 0 | 48 | Black |
| $NbSe_2$ | 40 | 24 | Very light yellow | 25 | 48 | Deep red |
| $ZrTe_2$ | 80 | 48 | No indication | 0 | 72 | Gray |

TABLE 1-continued

Example TMDs and Oxidizing/Reducing Conditions

| TMD | Temp. of oxidation (° C.) | Time for oxidation reaction (hours) | Color indication for oxidation | Temp. of reduction (° C.) | Time for reduction (hours) | Color indication for reduction |
|---|---|---|---|---|---|---|
| $VS_2$ | 25 | 24 | No indication | 0 | 8 | Green |
| $TaS_2$ | 60 | 24 | Light yellow | 0 | 72 | Blue/gray |

Liquid phase exfoliation (LPE) has emerged as an alternative approach to prepare large quantities of a few layer $MoS_2$ and $WS_2$ flakes (e.g., nano-scale platelets 36). Metastable colloidal dispersions may be obtained by matching interfacial energy between the layered TMD material 30 and the solvent 25, followed by disruption of the interlayer bonding through aggressive mechanical treatment. N-methyl-2-pyrrolidone (NMP) is an example of an effective solvent for surfactant free exfoliation, yielding dispersions with a distribution of layer thicknesses from 2-12 nm after extended probe-tip sonication (400 W, >24 hr). LPE has been shown to be successful for $MoX_2$ and $WX_2$ (X=S, Se), but has been largely uninvestigated beyond these Group VI layered TMDs. Introduction of surfactants can reduce processing times and allows for use of alternative solvent systems, although single to few-layer yields remain low (3%) and additional purification steps are required before subsequent surface functionalization or implementation for electronics.

The chemistry underlying liquid phase exfoliation (LPE) of $MoS_2$ in NMP shifts the focus from surface energy matching to redox chemistry. Redox active species form in-situ during LPE through an auto-oxidation pathway that converts NMP to N-methyl succinimide by 5-hydroxy-N-methyl-2-pyrrolidone intermediates. Promotion of this auto-oxidation pathway under ambient conditions, such as via thermal treatment or sonication, results in oxidation to $Mo^{VI}$ and $Mo^V$ species and exfoliation without mechanical forces. Suppression of auto-oxidation via processing in an inert atmosphere or under anhydrous conditions frustrates exfoliation even with extreme probe-tip sonication.

Initially, preferential edge-oxidation of the TMD material 30 forms the high valency transition peroxo-metalate intermediates 50. Partial reduction of these peroxo-metalate intermediates 50 in a solution with the reducing agent 65 induces a transition of the peroxo-metalate intermediates 50 to form the POM 70, which absorb onto the TMD material 30. Layer separation then occurs via coulombic repulsion due to the ability of POM clusters to accommodate large amounts of charge. Several transition metals (e.g. Mo, W, V, Re, Ta, and Nb) may be used form anionic POMs 70.

Figure 1C:
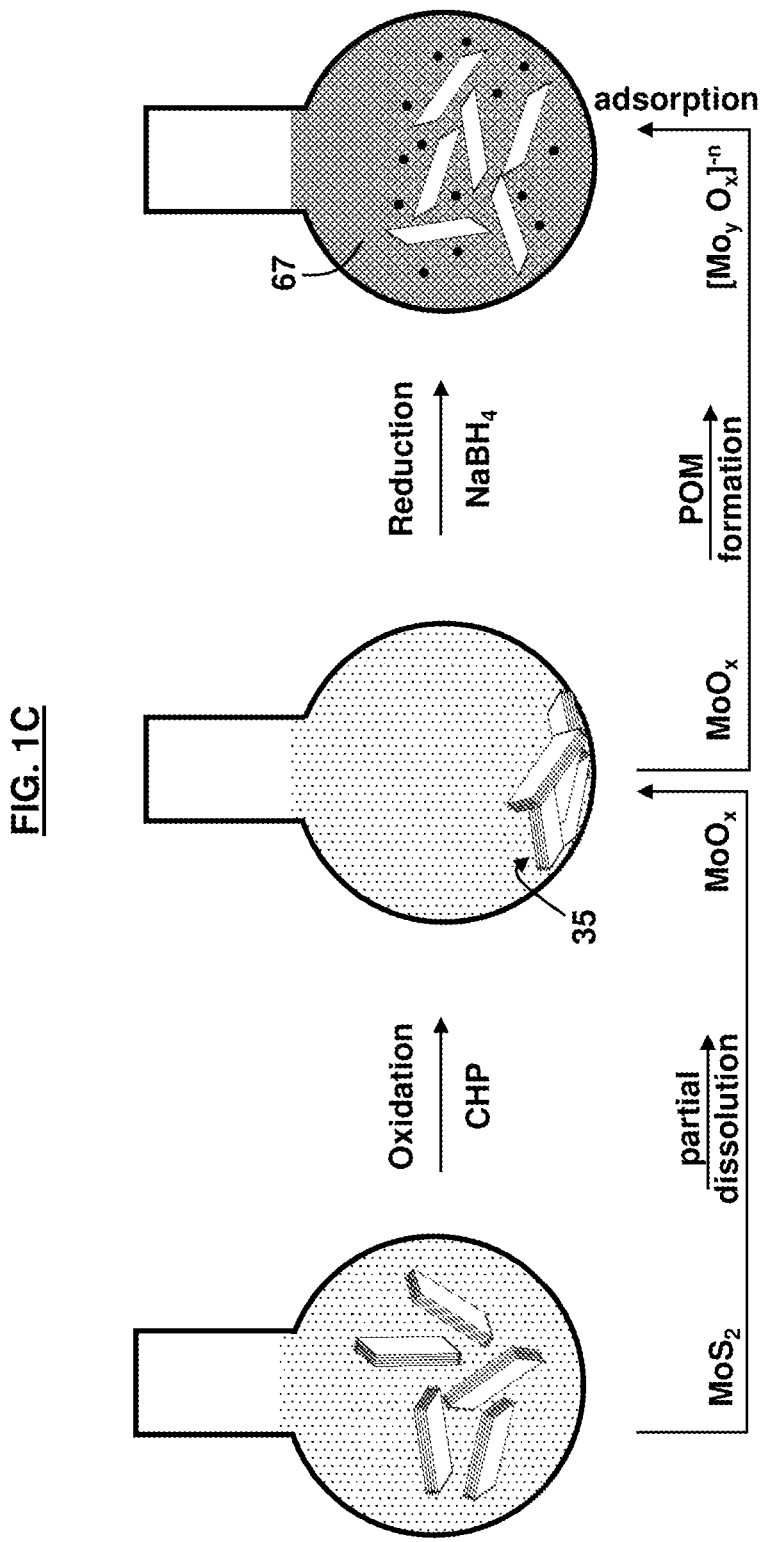
FIG. 1C is a schematic diagram illustrating a redox process for exfoliating layered TMD powders, according to an embodiment herein.
Figure 2:
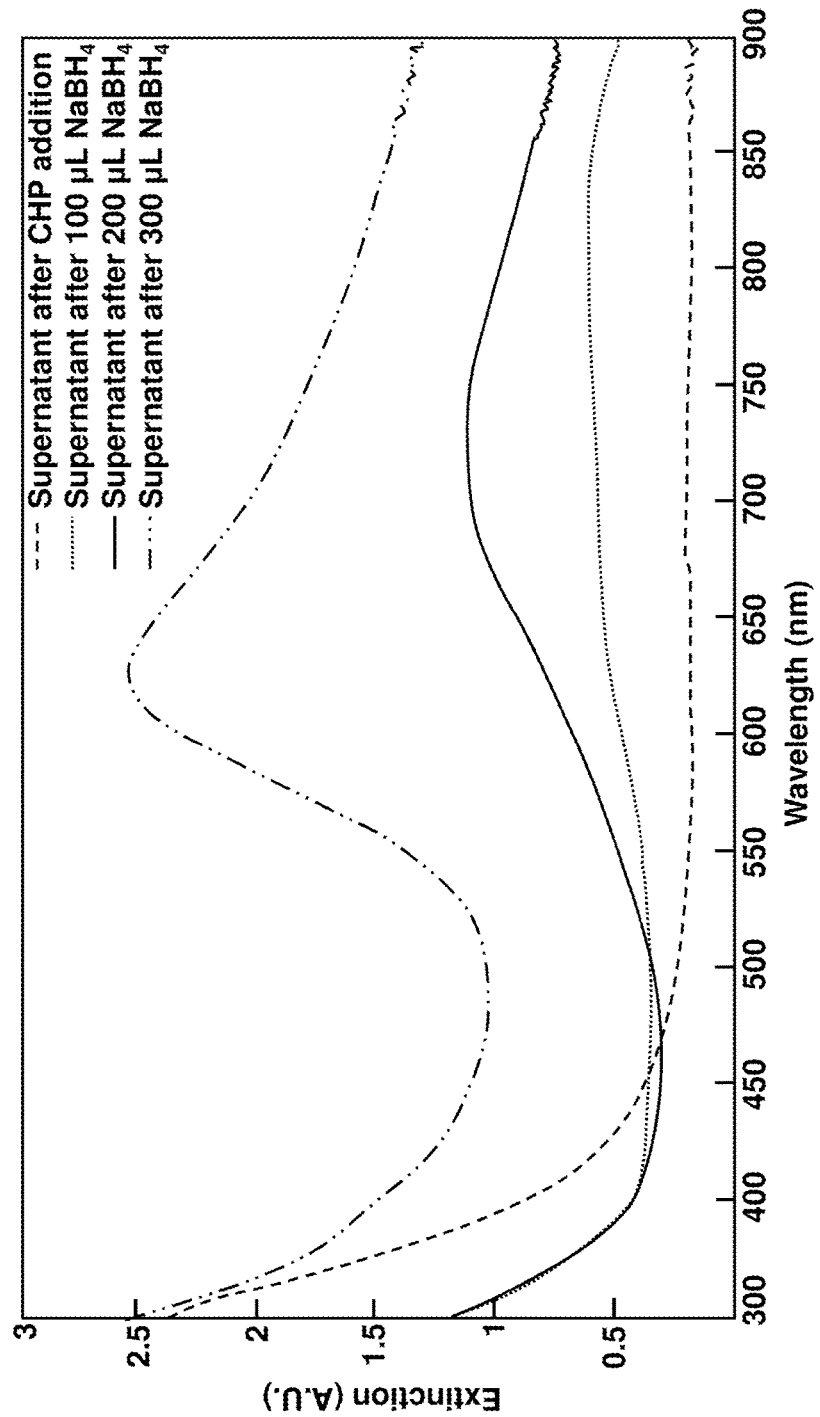
FIG. 2 illustrates mass spectra of isolated supernatant from $MoS_2$ after the addition of 300 mL of $NaBH_4$, according to an embodiment herein.
Figure 3:
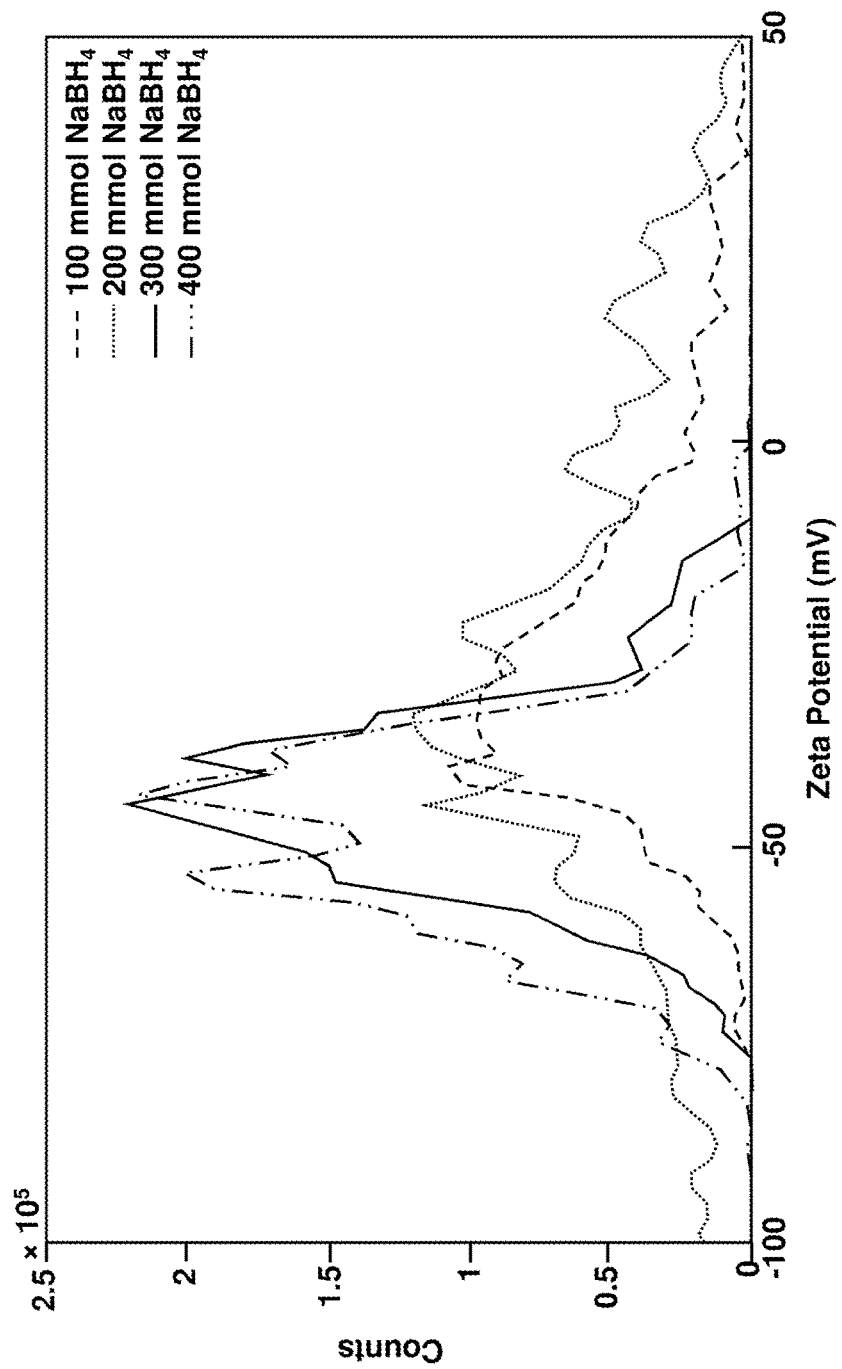
FIG. 3 illustrates the Zeta potential of $MoS_2$ after oxidation with CHP and the subsequent incremental addition of $NaBH_4$, according to an embodiment herein.

Using $MoS_2$ as an exemplary material, FIG. 1C demonstrates an exfoliation technique following the redox process using cumene hydroperoxide (CHP) (5:1 mol/mol CHP:$MoS_2$) in $CH_3CN$ (ACN) at 0° C. $CH_3CN$ may be chosen as an example solvent 25 due its resistance to oxidation as the nitrile carbon is in the same oxidative state as carboxylic acids (R—COOH), and unlike NMP, does not form thermal or oxidative fragmentation products. Anhydrous $CH_3CN$ may be used and stored under molecular sieves (not shown) to prevent hydrolytic side reactions. Specific reagent concentration and procedures are described below.

When used, initially, the CHP:$MoS_2$ solution is yellow, reflecting the presence of peroxo-$Mo^{VI}$ species. Similar behavior occurs in other polar solvents, such as acetone and ethanol. The initial oxidized flakes (e.g., nano-scale platelets 35) do not disperse, even after aggressive sonication, nor upon sedimentation and transfer to NMP. This suggests that etching alone does not drive exfoliation. The yellow product can be transferred to non-polar solvents (e.g., toluene and dichloromethane), suggesting a weakly charged or neutral species is formed. This is consistent with peroxidation of molybdenum compounds in organic media.

Following the initial CHP oxidation step, the addition of a reductant (i.e., reducing agent 65) (e.g. $NaBH_4$ (0.10 M, 400 µL, 0° C.)) transforms the supernatant from yellow, to blue and finally brown. In concert with the color change, the $MoS_2$ flakes (e.g., nano-scale platelets 35) disperse. The solubility of the initial sediment increases substantially as the solution 67 transforms to blue, but then drastically reduces upon further reduction to brown. Mass spectra shown in FIG. 2 of the blue supernatant indicates the presence of large species (~3000 g/mol), consistent with the formation of mixed-valency polyoxomolybdate (POMo) via the condensation of peroxo-$Mo^{VI}$ species through Mo—O—Mo bridges. Additionally, the colormetrics (i.e., yellow→blue for Mo species) coincide with zeta potential measurements that show a transition from a broad weak zeta potential (~5 mV) for the few flakes dispersed in the initial yellow solution, to large negative values (~40 mV) for the substantial number of dispersed flakes following reduction shown in FIG. 3. Thus, the increased solubility and delamination of $MoS_2$ as the valency within the POMo shifts from $Mo^{VI}$ to $Mo^V$ suggest that increasing charge incorporation in the clusters of POM 70 and basal surface adsorption provides sufficient coulombic repulsion to initiate and drive layer separation. Collectively, these characteristics are very unlikely to arise from basal surface absorption of solvent molecules, such as previously attributed to stabilizing flakes in NMP after sonication. Thus, redox exfoliation can be thought of as a 3-step process: 1) slight dissolution of the TMD material 30 to form peroxo-metalate intermediates 50; 2) in-situ generation of negatively charged POMs 70 from these peroxo-metalate intermediates 50; and 3) basal surface absorption of the negatively charged POMs 70 resulting in exfoliation and electrostatically stabilized colloidal dispersion.

Optimizing conditions relative to this process may result in $MoS_2$ suspensions that are stable for >24 hours. Specifically, $MoS_2$ powder may be initially oxidized with CHP to form a $MoS_2$ slurry 20. Controlled reduction of this slurry 20 via slow addition of $NaBH_4$ (0.10 M, 400 µL, 0° C.) results in yields of suspended flakes in ethanol or ACN up to 80-90% with respect to the initial powder mass. To isolate few-to-monolayer flakes (e.g., nano-scale platelets 36) in solution 67, centrifugation may be utilized to selectively sediment larger multilayers particles from the suspension as further described below. Such fractionation indicates that the optimized conditions may yield ~10% by mass of few-to-mono layer flakes (e.g., nano-scale platelets 36).

The use of mechanical shear after the quiescent redox exfoliation may further increase yield. For example, applying a high-speed mixer at approximately 20000 RPM for 1 hour to the initial suspension may increase solution viscosity substantially, consistent with an increased particle number density. The yield of dispersed few-to-monolayer $MoS_2$ flakes may increase by 50%. In addition to the initial exfoliation of $MoS_2$, sedimentation and re-dispersion can be repeated to continually remove excess reagent or fractionate the size of the dispersed layers. For example, re-dispersion of the exfoliated $MoS_2$ can be achieved in a range of polar solvents 25 (e.g. ethanol, methanol, NMP, DMF, acetone, ACN).

Figures 4A, 4B:
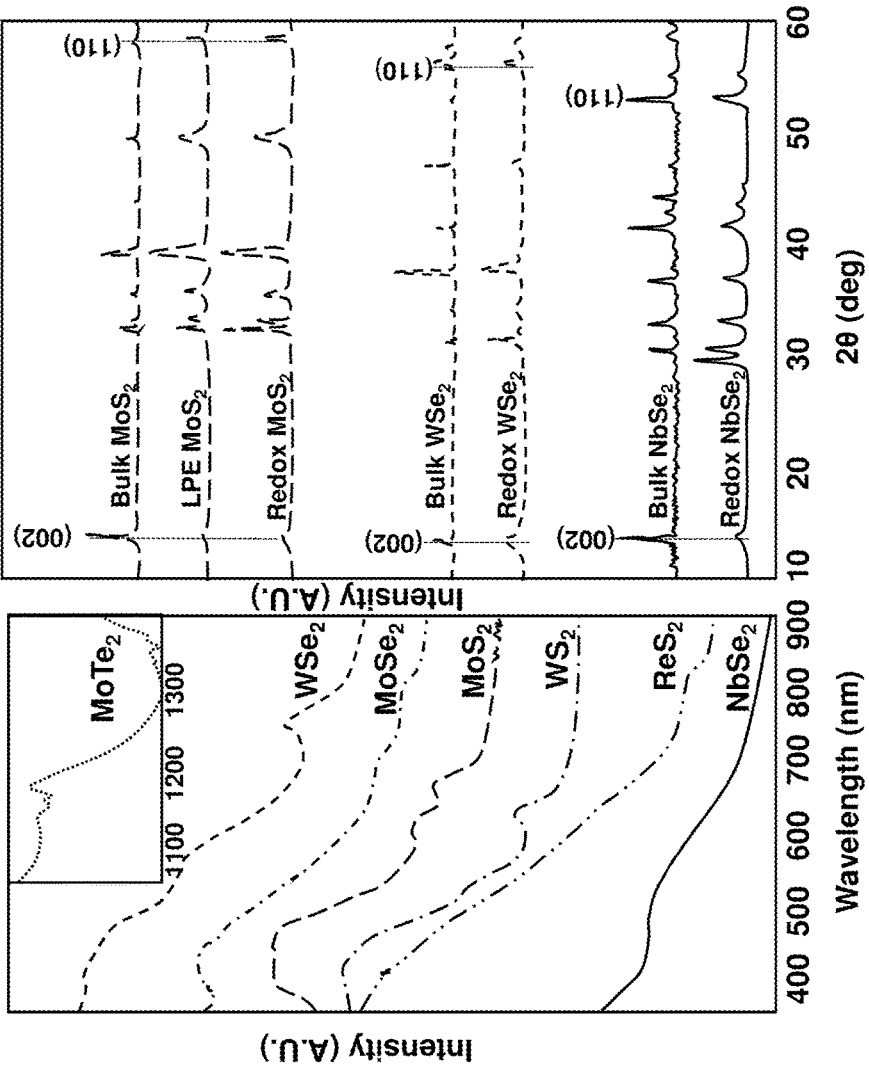
FIG. 4A illustrates ultraviolet-visible spectrophotometry (UV-Vis) extinction spectra which confirm direct band transitions for $MoX_2$, $WX_2$, and $ReS_2$, according to an embodiment herein.
FIG. 4B illustrates solution XRD spectra of concentrated $MoS_2$, $WSe_2$, and $NbSe_2$ dispersions compared to bulk powders, according to an embodiment herein.

FIGS. 4A and 4B demonstrate the redox exfoliation for seven Group V-VII layered TMD materials 30. Analogous to $MoS_2$, layered TMD materials 30 with metal centers that form highly anionic POMs 70 (e.g., M=Mo, W, Nb, Re) may be exfoliated in $CH_3CN$ with excess CHP (5:1 mol:mol CHP:TMD), followed by partial reduction with dilute $NaBH_4$ to drive dispersion. For example, the transformation from colorless to orange is consistent with the formation of anionic PONb species. The suspensions may be allowed to react at 273K under quiescent ambient conditions for 24 hrs, where the concentration and volume of $NaBH_4$ may be added and may be determined by titration of the supernatant until the colormetric response corresponding to mixed-valency POM 70 is obtained. The resulting suspensions may be centrifuged at approximately 10000 RPM for 15 minutes to sediment the slurry 20 and remove the reducing solvent 65. The suspensions may then be reconstituted in anhydrous $CH_3CN$ (or other polar solvents) and fractionated via centrifugation. Optimization of the reduction rate for each layered TMD material 30 may result in highly concentrated (upwards to 3 mg/mL) dispersions of few-to-monolayer flakes that are stable in solution for more than two months. Layered TMD materials 30 containing transition metals that do not have accessible higher valent states, such as Ti, may not show a colormetric response, nor is dispersion possible (e.g. $TiS_2$). The low charge and high basicity of Ti-oxometalates lead to $TiO_2$ nanoparticle formation in the absence of appropriate capping agents (such as polyvinyl alcohol, for example) to control the growth of the nanoparticles, rather than mixed-valency POMs 70. Thus, delamination via the redox process does not occur.

Figure 5:
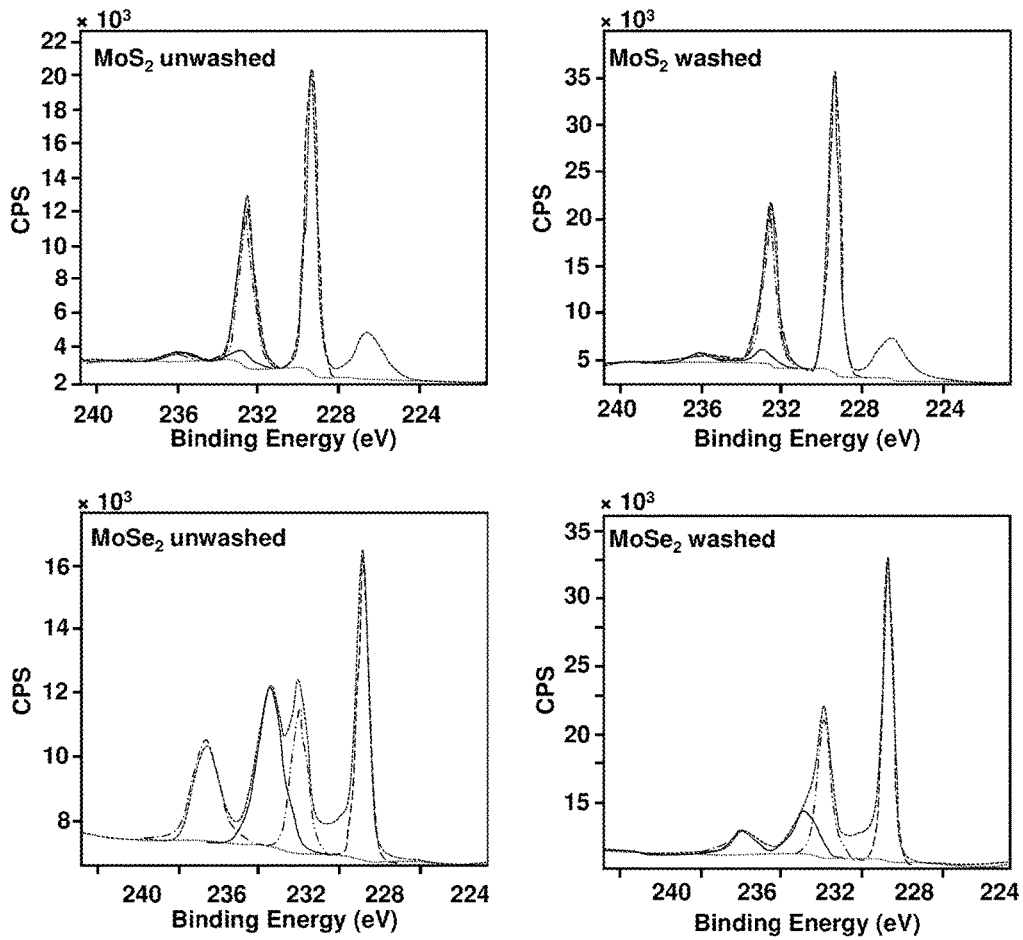
FIG. 5 illustrates XPS spectra of the Mo $3d_{5/2}$ (236.0 eV) and Mo $3d_{5/2}$ (234.2 eV before and after washing cycles, according to an embodiment herein.
Figure 6:
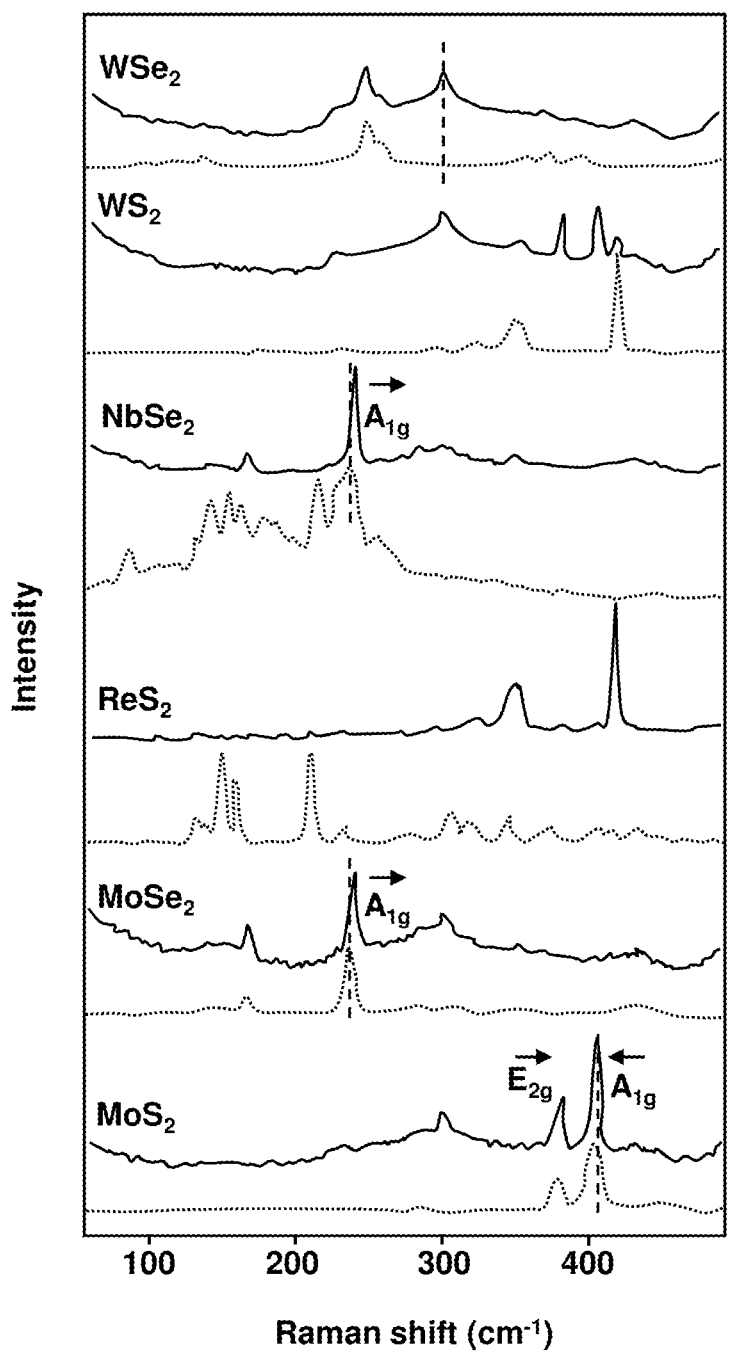
FIG. 6 illustrates Raman spectra of few layer and bulk TMDs, according to an embodiment herein.
Figure 7:
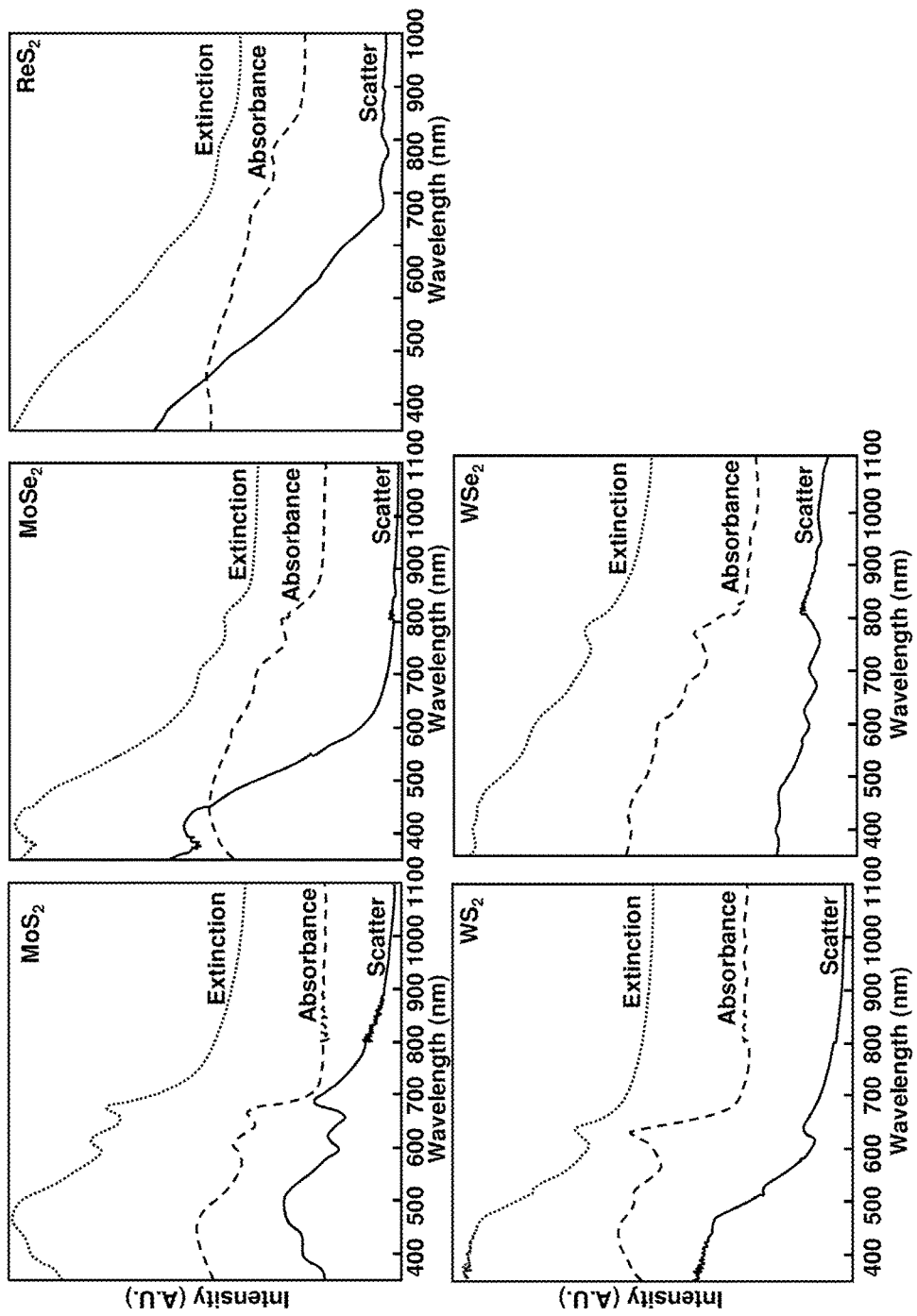
FIG. 7 illustrates the extinction, absorption, and scattering profiles of various TMDs, according to an embodiment herein.

The presence and removal of the POM 70 may be confirmed by X-ray photoelectron spectroscopy (XPS) of drop-cast $MoS_2$ films prepared during each step of the reaction as shown in FIG. 5. Initially, the $MoS_2$ suspensions in acetonitrile (ACN) may contain small amounts of $Mo^{VI}$ species from stirring in solvent (acetonitrile). The addition of CHP may result in the additional formation of $Mo^{VI}$, upwards of 12% of Mo by mass. Subsequent reduction of the peroxo-molybdate-$MoS_2$ slurry 20 may result in a decrease in $Mo^{VI}$ species (12.10%→6.64%). After washing the flakes (e.g., nano-scale platelets 36) with fresh solvent 25, the $Mo^{VI}$ species may further decrease from 6.64%→1.95%. The Mo:S ratio is higher than the expected 1:2 ratio, while the $Mo^{IV}$:S ratio remains relatively constant at 1:2.

The XPS results suggest that the integrity of the $MoS_2$ flakes (e.g., nano-scale platelets 36) remain intact and that the $Mo^{VI}$ species are distinct, and not within the $MoS_2$ flake (e.g., nano-scale platelets 36). The largest deviations from the expected Mo:S ratio occur during the oxidation step, where the $Mo^{VI}$ abundance is the highest. Following reduction and washing, the abundance of $Mo^{VI}$ decreases substantially, suggesting that the $Mo^{VI}$ species are weakly bound and can be removed. Similar trends are observed in $MoSe_2$ films where excess Mo is associated with $Mo^{VI}$, and after washing the abundance of $Mo^{VI}$ decreases (16.5→8.3%).

Raman spectroscopy of films formed from the few-to-monolayer dispersions is also consistent with few-to-monolayer flakes. In $MoS_2$, the $A_{1g}$ vibrational mode, which corresponds to out of plane sulfur vibrations, undergoes a positional blue shift upon reduction of layer thickness. Correspondingly, the $E_{2g}$ vibrational mode, arising from in-plane sulfur vibrations, undergoes a red shift in energy. These shifts and their peak-to-peak difference (i.e., $A_{1g}$–$E_{2g}$) can be used to confirm the presence of few-to-monolayer flakes relative to thick flakes found in bulk powder. For the TMD materials 30 dispersed via redox exfoliation (e.g., $MoS_2$, $MoSe_2$, and $NbSe_2$), characteristic blue-shifts in the $A_{1g}$ mode, and change in $A_{1g}$–$E_{2g}$ separation, are observed in FIG. 6. For example, bulk $MoS_2$ has a $A_{1g}$–$E_{2g}$ separation of 26 $cm^{-1}$, while redox exfoliated $MoS_2$ exhibits an $A_{1g}$–$E_{2g}$ separation of 24 $cm^{-1}$. This suggests that the average thickness of exfoliated $MoS_2$ flakes are between 3-6 monolayers. In addition to these peak shifts, optically inactive modes ($B_{2g}$) in bulk $MoSe_2$ and $WSe_2$ transform to active modes upon exfoliation. For example, $B_{2g}$ may be observed in $MoSe_2$ (353 $cm^{-1}$) and $WSe_2$ (301 $cm^{-1}$).

UV-Vis extinction measurements of the dispersed layered TMD materials 30 in $CH_3CN$ (shown in FIG. 4A) are also consistent with the spectra of single to few-layer structures. The direct transition for $ReS_2$ and the shift from indirect to direct bandgap of $MoX_2$ and $WX_2$ may be observed. From the corresponding absorption spectra shown in FIG. 7, the A-exciton transitions (2H-$MX_2$) yield the following results: $MoS_2$ (1.85 eV; 670 nm); $MoSe_2$ (1.5 eV; 805 nm); $WS_2$ (1.95 eV; 629 nm); $WSe_2$ (1.63 eV; 760 nm); $ReS_2$ (1.55 eV; 810 nm); $MoTe_2$ (1.1 eV; 1175 nm).

With respect to $MoS_2$, there is an empirical relationship between the layer dimensionality and the intensity of the A-exciton maxima in the extinction spectra and the local minima at 345 nm, where the latter cross-section ($\varepsilon_{345}$=69 mL $mg^{-1}cm^{-1}$) is independent of scattering. This procedure reduces the uncertainty that arises due to the subtraction of the size-dependent scattering background. This approach yields an average thickness of 4.3 nm (6-8 layers) for the redox exfoliated $MoS_2$ in $CH_3CN$ (A-exciton 671 nm). This suggests redox exfoliation is as effective for exfoliation as LPE while simultaneously being quiescent, low cost, and flexible with respect to the choice for the solvent 25.

Figure 8:
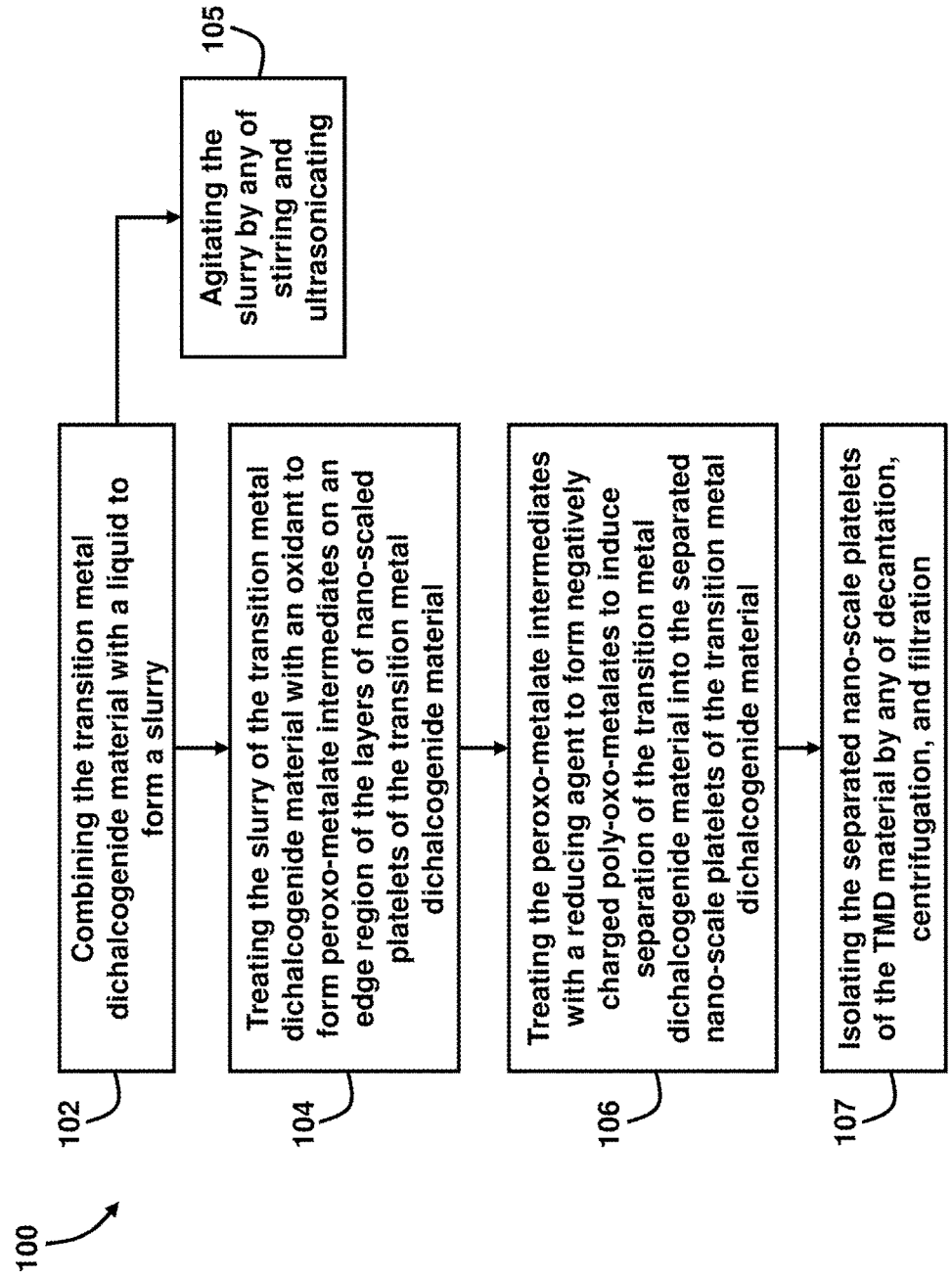
FIG. 8 is a flow diagram illustrating a method of exfoliating a transition metal dichalcogenide material to produce separated nano-scale platelets, according to an embodiment herein.
Figure 9:
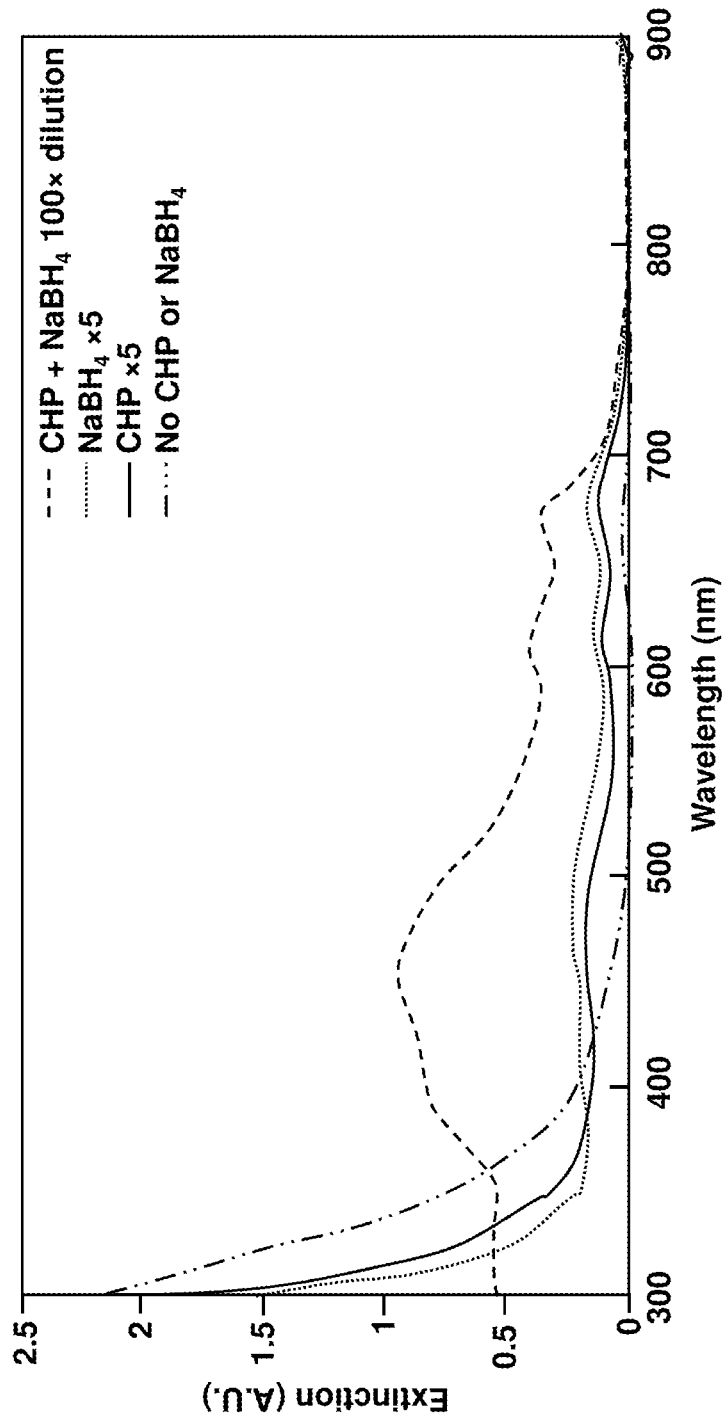
FIG. 9 illustrates extinction spectra of 1 mg $MoS_2$ (0.625 mmol) suspended in 1 mL $CH_3CN$ (ACN; acetonitrile) with the addition of CHP and $NaBH_4$, with only $NaBH_4$ (no CHP), with only CHP (no $NaBH_4$), and without CHP or $NaBH_4$, according to an embodiment herein.

FIG. 8, with reference to FIGS. 1A through 7, is a flow diagram illustrating a method 100 of exfoliating a transition metal dichalcogenide material 30 to produce separated nano-scale platelets 36, the method 100 comprising combining (102) the transition metal dichalcogenide material 30 with a liquid 25 to form a slurry 20, wherein the transition metal dichalcogenide material 30 comprises layers 32 of nano-scale platelets 35 and has a general chemical formula $MX_2$, and wherein M is a transition metal and X is sulfur, selenium, or tellurium; treating (104) the slurry 20 of the transition metal dichalcogenide material 30 with an oxidant 45 to form peroxo-metalate intermediates 50 on an edge region 55 of the layers 32 of nano-scale platelets 35 of the transition metal dichalcogenide material 30; and treating (106) the peroxo-metalate intermediates 50 with a reducing agent 65 to form negatively charged poly-oxo-metalates 70 to induce separation of the transition metal dichalcogenide material 30 into the separated nano-scale platelets 36 of the transition metal dichalcogenide material 30.

In an example, reducing agent treatment of the oxidized transition metal dichalcogenide material 30 may be achieved by portion-wise addition of the reducing agent 65, while maintaining the oxidized transition metal dichalcogenide material 30 at a temperature within a range from about −20° C. to about 100° C. In an embodiment, the peroxo-metalate intermediates 50 may be reacted with the reducing agent 65 at a first temperature (e.g., 0° C.) and then the oxidized transition metal dichalcogenide material 30 may be warmed to a second temperature (e.g., 25° C.). During the reducing agent treatment, the oxidized transition metal dichalcogenide material 30 may be agitated (e.g., stirring or ultrasonicating, for example). Alternatively, the oxidized transition metal dichalcogenide material 30 may be agitated (e.g., stirring or ultrasonicating, for example) after addition of the reducing agent 65.

The transition metal may comprise any of titanium, zirconium, hafnium, vanadium, niobium, tantalum, molybdenum, tungsten, rhenium, nickel, palladium, platinum, copper, silver, and gold, wherein the chalcogenide comprises any of sulfur, selenium, and tellurium. The method 100 may comprise agitating (105) the slurry 20 by any of stirring and ultrasonicating. The liquid 25 may comprise an organic solvent selected from the group consisting of a polar protic solvent, a polar aprotic solvent, and combinations thereof. The organic solvent may be selected from the group consisting of acetonitrile, methanol, ethanol, acetone, methyl ethyl ketone, N,Ndimethylformamide, N-methylpyrrolidone, and combinations thereof. The reducing agent 65 may comprise any of a hydride donor and an electron transfer species. The hydride donor may comprise any of sodium borohydride and lithium borohyride, and the electron transfer species may comprise any of ascorbic acid and hydroquinone. The oxidant 45 may comprise any of peroxide and peroxo-acid. The peroxide may comprise any of cumene hydroperoxide, hydrogen peroxide, and 3-chloroperbenzoic acid. The method 100 may comprise isolating (107) the separated nano-scale platelets 35 of the transition metal dichalcogenide material 30 by any of decantation, centrifugation, and filtration.

Experiments

The following describes some example experimental procedures, which may be used to practice the embodiments herein. The descriptions, equipment, parameters, and materials, etc. described in the experimental procedures are merely examples, and as such, other equipment, parameters, and materials, etc. may be utilized in accordance with the embodiments herein. Moreover, the values described below are approximations.

Materials:

N-methyl-2-pyrrolidone (NMP), acetonitrile ($CH_3CN$), dimethyl formamide (DMF), ethanol (EtOH), acetone (($CH_3$)$_2$CO), cumene hydroperoxide (80%, CHP), molybdenum(IV) sulfide ($MoS_2$), tungsten(IV) sulfide, molybdenum(IV) selenide, tungsten(IV) selenide, rhenium(IV) sulfide, niobium(IV) selenide, and molybdenum(IV) telluride. NMP and DMF may be distilled in the presence of $CaH_2$ at 300 mTorr at 60° C. $CH_3CN$ may be distilled in the presence of $CaH_2$ under an argon flow. All solvents may be stored in argon purged bottles under activated molecular sieves (3 Å). Molecular sieves may be activated by heating for 24 hours under vacuum (150° C., 300 mTorr).

Surface Oxidation of $MoS_2$:

A 3-neck round bottom flask may be initially evacuated (300 mTorr) for 5 minutes and backfilled with argon gas. This may be performed three times to ensure removal of $O_2$. Because $MoS_2$ dissolution occurs under ambient atmosphere, the reactions may be carried out with minimization of side reactions by utilizing anhydrous, distilled solvent and inert atmosphere. Moreover, the experimental results are insensitive to atmosphere and water content in solvent for all TMD materials 30 investigated. Following, 0.625 mmol (100 mg) of $MoS_2$ suspended in 5 mL $CH_3CN$ may be added through a septa seal into the purged round bottom flask and stirred at 0° C. using an ice bath. After the temperature is equilibrated (about 30 minutes), 3 mmol of cumene hydroperoxide (562 μL of 80% CHP) in 5 mL of $CH_3CN$ may be added dropwise to the $MoS_2$ suspension over the course of 15 minutes. The mixture may be stirred at 273K (0° C.) and kept at this temperature throughout the addition of CHP. The supernatant of the suspension may become discolored within 60 minutes. After all CHP is added, the ice bath may be removed, and the reaction may be allowed to stir at 25° C. for 24 hrs.

Exfoliation of $MoS_2$:

The stirring of the mixture may end after 24 hours and the $MoS_2$ powder may be allowed to settle (~10 minutes), the volume may be reduced to 4 mL by pipetting out the yellow supernatant. The temperature may be reduced to 0° C. using an ice bath and allowed to equilibrate for 30 minutes. Following equilibration, 50 μL of a fresh, ice cold aqueous solution of 0.10 M $NaBH_4$ (38 mg $NaBH_4$, 10 mL $H_2O$) may be quickly added to the oxidized TMD solution at 273K (0° C.) and stirred for 1 hr. Additional portions of 100 μL of 0.10 M $NaBH_4$ may be added in 1 hr intervals until a total of 350 μL has been added. After $NaBH_4$ addition is completed, the ice bath may be removed and the solution may be allowed to stir for 24 hrs at room temperature. The viscosity of the solution increases, and the suspension may turn from a dull gray to a green color, indicating exfoliated TMD material 30.

Quantitative determination of the exfoliated concentration can be monitored after each $NaBH_4$ addition step to determine when maximum concentrations are achieved and when to stop $NaBH_4$ addition and continue to the next step. Examples of the monitoring process are described below. The parameters described including time, speed, and volume are merely examples and are not meant to limit the scope of the embodiments herein. In an example: one hour after the first aliquot of $NaBH_4$ is added, 1 mL of the slurry is extracted out via pipette transfer and centrifuged at 10,000 RPM to pellet the nanomaterial out. The polyoxo-metalates and peroxo-metalates may have a strong absorption in the region of interest (~350 nm) for determining concentration of the nano-materials. Subsequently, the optically clear, slightly yellow solvent is discarded and fresh solvent (acetonitrile) is added. This step may use a quantitative measurement to determine how much solvent is removed and how much is added back in because the process is measuring concentrations of dispersed nanomaterials in the next step. In an example, a balance may be used to determine the mass of solvent that is removed such that the same mass of solvent may be added back in.

The slurry may then be mixed via a vortexer or a sonication bath for 30 seconds and centrifuged at a lower RPM (~1500 RPM) for 10 minutes. The centrifuge speed should be selected to separate out un-exfoliated material (i.e., bulk) from exfoliated (i.e., dispersed) materials. If the speed is too low, the separation may take too long for monitoring (i.e., hours for separation), and if the speed is too high, some exfoliated flakes will sediment giving an inaccurate measurement of dispersed nano-material and subsequently poor quantitative information from UV-Vis on dispersed concentrations.

After the centrifugation step, exfoliated nano-material are dispersed in the liquid phase while un-exfoliated material is sedimented. A known volume of the dispersed flakes in the liquid phase is diluted into a cuvette for UV-Vis extinction measurements (e.g., in this case, 100 μL of the dispersed flakes is dispersed into a cuvette with 2.90 mL of acetonitrile; a 30-fold dilution).

From the extinction spectra, the concentration of $MoS_2$ can be determined using the extinction co-efficient at the local minima at 349 nm ($\varepsilon_{349}$=69.10 mLmg$^{-1}$cm$^{-1}$). These extinction coefficients are empirically derived. If the intensity of the extinction spectra at 349 nm of the previous aliquot of $NaBH_4$ is less than the current measured extinction spectra, additional aliquots of $NaBH_4$ is added. This process is repeated until the previous measured extinction spectra intensity at 349 nm is equal to or less than the currently measured spectra, where upon no further $NaBH_4$ is added, and the process continues.

At this point, the solution can be probe sonicated (30 minutes), or mixed (e.g., 20,000 RPM, for 1 hr) after transferring the suspension to a 20 mL flat bottom vial. This further increases the yields approximately by a factor of two. The solvents that may be used include: acetonitrile, acetone, and ethanol. After addition of $NaBH_4$ and optional probe sonication, the stir may be removed and large, unexfoliated flakes may be allowed to settle. The supernatant may be isolated and centrifuged at 10000 RPM for 15 minutes to sediment the exfoliated flakes. The optically clear, colorless supernatant containing excess CHP and possibly unreacted molybdates may be discarded, and fresh anhydrous solvent (e.g. $CH_3CN$, DMF, NMP) may be added and the suspension may be homogenized in a vortexer. The suspension may be subsequently centrifuged at 1500 RPM for 30 minutes. The resultant supernatant contains exfoliated $MoS_2$ flakes and may be isolated for analysis by XRD, AFM, SEM, and TEM. Weaker reducing agents (e.g., hydroquinone, ascorbic acid, or sodium tribasic citrate) may be not able to reduce the yellow peroxomolybdate complex effectively, resulting in poor yields and quality.

Titration of $MoS_2$ with $NaBH_4$:

To determine appropriate amounts of $NaBH_4$ to add for efficient exfoliation, a portion of each reaction may be taken and titrated with $NaBH_4$. After the surface oxidation step, a 1 mL aliquot may be taken out of the reaction vessel and $NaBH_4$ (0.10 M) may be added in 20 μL portions (at 0° C.) and mixed for 5 minutes under mechanical stir. Subsequently, the mixture may be centrifuged at 1000 RPM (5 min) to monitor the exfoliation of $MoS_2$ flakes. This stepwise titration of $MoS_2$ may be performed until flakes are visibly dispersed in solution (i.e., $MoS_2$ is suspended in the supernatant after centrifugation). The supernatant color changes from yellow (20-40 μL $NaBH_4$), to green (40-100 μL $NaBH_4$), to light blue (>100 μL $NaBH_4$). After ~100 μL $NaBH_4$ $MoS_2$ flakes slowly start to exfoliate into the solution. Further addition of $NaBH_4$ increases yields of exfoliated $MoS_2$ (~350 μL), after which point the exfoliation yields subsequently decrease with further addition of $NaBH_4$. At this point, a brown precipitate may be occasionally observed and immediate flocculation of $MoS_2$ may be observed.

The experimental determination of the molar extinction coefficient is outlined below:

(1) From a concentrated dispersion of exfoliated nano-materials (for example, $MoSe_2$), 1 mL of the solution is extracted to a pre-weighed vial. The solvent is evaporated via vacuum (200 mTorr) at 120° C. for 1 hour. The remaining residue in the vial contains the exfoliated materials that were dispersed in that 1 mL volume.

(2) The vial is then weighed again, and the difference of mass (Vial+Sample) minus (empty vial) yields the mass of nano-materials that were dispersed in the initial 1 mL aliquot.

(3) From the remaining initial concentrated solution, a dilution series is created by mixing a known volume of the concentrated dispersion (in this case, 5, 10, 100, 200, 300 μL) to anhydrous acetonitrile for final dilution values of 600×, 300×, 30×, 15×, 10×, respectively.

(4) The UV-Vis extinction spectra are obtained for each of these diluted dispersions.

(5) From step 1, the concentration of the exfoliated flakes in each dilution series can be determined (e.g., taking the ratio of the dilution value by the initial concentration that was determined by mass difference).

(6) Finally, by plotting the intensity of the extinction at a particular wavelength (e.g., 369 nm for $MoSe_2$) against the concentration for each diluted sample, a linear relationship is obtained yielding the extinction co-efficient as the slope (e.g., 44.14 mLmg$^{-1}$cm$^{-1}$).

(7) From the obtained extinction coefficient, the concentration of any exfoliated dispersion of $MoSe_2$ can be determined using Beer's Law ($A=\varepsilon cl$), where A is the absorbance of the material, $\varepsilon$ is the molar extinction coefficient, c is the solution concentration, and l is the length of the path of light that must travel in the solution.

Table 2 provides example thresholds of $NaBH_4$ for a given TMD:Oxidant ratio (mol:mol) with maximum dispersed concentrations given in mg/mL for $MoS_2$, $MoSe_2$, $MoTe_2$. For the $MoSe_2$ series, increasing the oxidant from a 1:1 TMD:Oxidant ratio (10 mmol:10 mmol) to 1:3 TMD:Oxidant (10 mmol:30 mmol) ratio has marginal effects on the exfoliation quantity (c.a. 1 mg/mL). Thus, optimal ratios of TMD:Oxidant can be determined by this monitoring process. In all cases, 10 mmol of TMD are used with varying the amount of oxidant indicated by the ratios in column 2 of Table 2.

TABLE 2

Example thresholds of $NaBH_4$ for given TMD:Oxidant ratio

| TMD | TMD:oxidant ratio | Max dispersed concentration (mg/mL) | Threshold $NaBH_4$ (μmol) |
|---|---|---|---|
| $MoS_2$ | 1.0:1.0 | 0.650 | 45 |
| $MoS_2$ | 1.0:0.1 | 0.110 | 7 |
| $MoSe_2$ | 1.0:3.0 | 1.0 | 75 |
| $MoSe_2$ | 1.0:1.0 | 0.96 | 55 |
| $MoSe_2$ | 1.0:0.1 | 0.13 | 25 |
| $MoTe_2$ | 1.0:1.0 | 0.55 | 27 |
| $MoTe_2$ | 1.0:0.1 | 0.22 | 17 |

Optimization of $MoS_2$ Exfoliation:

Maximum exfoliation for each TMD material 30 can be optimized by varying amounts of the oxidant (CHP) with constant amount of reducing agent 65 ($NaBH_4$). As an example, dispersions with constant $MoS_2$ concentration (3 mg/mL in $CH_3CN$, 10 mL total) may be treated with varying amounts of CHP (0.1 mmol→10 mmol) and reduced with a constant amount of $NaBH_4$ to tune in-situ formation of POM 70. The solution may be analyzed for mass of suspended flakes (i.e., no centrifugation), and mass of exfoliated flakes (centrifugation 1500 RPM, 30 minutes) via UV-Vis spectroscopy techniques. For low loading ratios of CHP, (1:10 CHP:$MoS_2$), suspension and exfoliation may be low (15% and 0.6% respectively). As the amount of CHP increases, the concentration of suspended flakes may also increase to almost quantitative (88%) suspension with a CHP:MoS$_2$ ratio of 5 (mol:mol). This may also yield the maximum amount of mono-to-few layer flakes (~10%). Further increase of CHP may reduce the amount of suspended MoS$_2$, until a critical threshold (~10:1 CHP:MoS$_2$) where upon no exfoliation occurs. Interestingly, the addition of NaBH$_4$ to suspensions of high loading ratio CHP:MoS$_2$ may fail to give a blue colormetric response, suggesting that the formation of anionic POMo is suppressed. In these cases, the supernatant turns to a yellow-brown color and the addition of NaBH$_4$ affords a brown precipitate.

MoSe$_2$ Exfoliation:

Surface oxidation may be carried out identically to MoS$_2$. The resultant supernatant may be an optically clear yellow solution. The stir may be removed and the flakes sediment (~45 minutes). The volume may be reduced to 4 mL and the temperature may be reduced to 0° C. This temperature may be maintained for the duration of the reduction step. After equilibration (30 min.), 100 µL of a 0.010 M NaBH$_4$ solution may be added quickly. Subsequently, 10 µL of 0.10 M NaBH$_4$ may be added in 60-minute intervals (five times) and stirred for a total of 24 hours (at 0° C.). The viscosity may increase, and the color may turn from a dull gray to a dull red color, indicating exfoliation of MoSe$_2$. After 24 hrs, the ice bath may be removed, and the solution stirred for another 24 hrs at 25° C. Afterwards, the stir may be removed, large flakes may be allowed to settle, and the supernatant may be pipetted out and centrifuged at 10000 RPM for 30 minutes to sediment all the flakes. The optically clear, red supernatant may be discarded and anhydrous solvent (CH$_3$CN, NMP) may be added to suspend the exfoliated flakes. After homogenization via a vortexer, the mixture may be centrifuged at 1500 RPM for 45 minutes. The resultant supernatant contained MoSe$_2$ flakes and the top ⅔ of the supernatant may be pipetted and analyzed by XRD, AFM, SEM, and TEM. The addition of NaBH$_4$ in excess of 110 µmol may result in unrecoverable flocculation of MoSe$_2$.

MoTe$_2$ Exfoliation:

Oxidation and reduction may be carried out exactly as with MoSe$_2$. The supernatant after oxidation may be optically clear light yellow. After reduction, the supernatant may turn to an optically clear black solution.

WS$_2$ and WSe$_2$ Exfoliation:

Surface oxidation may be carried out at 333K (60° C.). All other conditions may be identical to MoS$_2$ oxidation. After oxidation, the heat may be removed and allowed to equilibrate to room temperature before proceeding. The powder may be allowed to sediment (~15 minutes) and the volume may be reduced to 4 mL. The temperature may be reduced to 273K and 20 µL of a 0.10 M NaBH$_4$ solution may be added. The viscosity may increase slowly, and the solution may be stirred for 24 hrs at 0° C. After 24 hrs, 100 µL of a 0.10 M NaBH$_4$ may be added and allowed to stir for an additional 24 hrs. This may be repeated for a total of 400 µL of 0.10 M NaBH$_4$, after which the supernatant may turn from a gray to a dull green color (WS$_2$) or dull red (WSe$_2$) color, indicating exfoliation of material. The temperature may be raised to 25° C. after NaBH$_4$ addition may be completed, and stirred for an additional 24 hrs. Isolation of flakes may be performed identically to MoS$_2$. The addition of NaBH$_4$ in excess of 400 µmol may result in unrecoverable flocculation of WX$_2$.

NbSe$_2$ Exfoliation:

Surface oxidation and reduction may be carried out identically to MoSe$_2$.

ReS$_2$ Exfoliation:

Surface oxidation may be carried out at 333K (60° C.). All other conditions may be identical to MoS$_2$ oxidation. After oxidation, the heat may be removed and allowed to equilibrate to room temperature before proceeding. The powder may be allowed to sediment (~5 minutes) and the volume may be reduced to 4 mL by pipetting the dark yellow optically clear supernatant. The temperature may be reduced to 273K and 10 µL of a 0.010 M NaBH$_4$ solution may be added quickly. The color of the suspension may slowly turn from gray to a red color, indicating exfoliation of ReS$_2$. After 3 hrs, 10 µL of a 0.10 M NaBH$_4$ solution may be added and the solution may be stirred for 24 hrs, during which the viscosity may increase. Isolation of flakes may be performed identically to MoS$_2$. The addition of NaBH$_4$ in excess of 75 µmol may result in unrecoverable flocculation of ReS$_2$.

After more than 400 different experimental trials, the incremental addition of NaBH$_4$ at a reduced temperature (0° C.) provides the most reproducibility. The addition of the reducing agent 65 at elevated temperatures (25° C.) increases variability, as well as reduces yield and flake quality (i.e., thick flakes ($\lambda_a$=680 nm) and low yields (<1% of initial mass). Furthermore, the addition of "excess" NaBH$_4$, defined here as a threshold volume where upon exfoliation, yields decrease, or flocculation occurs, also resulting in poor quality flakes, or more commonly, flocculation. This flocculation likely occurs due to the transition of the highly anionic, mix-valent POMs to neutral, low valent oxides. For example, in MoS$_2$, the solution transitions from yellow (initial oxidized solution, poor dispersion) to blue (reductant added, optimal dispersion) and finally brownish/yellow (excess reduction, poor dispersion). In general, the values presented herein are optimized for MoS$_2$ and then applied to the other layered TMD materials 30. The optimal conditions for MoS$_2$ exfoliation provides an initial guide due to similar chemistries across MS$_2$, MSe$_2$ and MTe$_2$ layered TMDs from Group IV, V, VI, and VII. Although extremely successful, differences in reactivity, redox states, and products across these TMDs imply that further increases in efficiency for TMDs beyond MoS$_2$ are possible with additional optimization of the reactions conditions.

Control Experiments:

Control experiments may be performed on MoS$_2$ where the procedure may be performed identically as discussed above with (1) CHP addition without NaBH$_4$ addition, (2) NaBH$_4$ addition without CHP, and (3) No CHP or NaBH$_4$ addition (i.e., stirred under ambient conditions for 24 hrs). UV-Vis spectra are summarized in FIG. 9 for (1). It may not be possible to suspend flakes after the addition of CHP in the absence of a reducing agent 65. These flakes could not be suspended even after solvent transfer to NMP or probe-tip sonication for 60 minutes. For (2), small quantities of exfoliated MoS$_2$ can be afforded by stirring MoS$_2$ in acetonitrile followed by reduction with NaBH$_4$. This may be attributed due to the dissolution of MoS$_2$ observed under these conditions. This can be confirmed as the supernatant may turn to a light blue color upon stirring MoS$_2$ in acetonitrile (or acetone) for 24 hours. For (3), stirring suspensions of MoS$_2$ in acetonitrile for 24 hours (i.e., no oxidant or reductant addition) affords no exfoliated flakes in solution.

Probe-Tip Exfoliation of MoS$_2$:

300 mg of MoS$_2$ in 10 mL of NMP may be loaded into a 20 mL capacity vial at 0° C. The dispersion may be continuously sonicated using a Vibra-cell sonicator with a 5 mm flat-tip probe operating at 127.5 W (20% 750 W) for 90 hrs. Afterwards, the suspension may be centrifuged at 10000 RPM for 15 minutes to sediment the flakes. The solvent may be removed, and fresh, anhydrous NMP may be added in equal volume. The suspension may be homogenized with a vortexer, and centrifuged at 1500 RPM for 45 minutes. The top ⅔ of the supernatant may be collected, containing $MoS_2$ flakes, (approximately 3 mg/mL, 3% yield, determined via UV-Vis spectroscopy) and may be analyzed with AFM and XRD.

Determination of TMD Yields:

A solution of electrostatically-stabilized and suspended TMD flakes contains a broad distribution of flake thickness, of which only a fraction are few-to-monolayer exfoliates. There is no accepted standard to report yields of few-to-monolayer flakes, and many times values reported in the literature as "exfoliated" are really the total mass of TMD flakes suspended in solution, and thus is much greater than the few-to-monolayer population. To estimate the yield of suspended and few-to-monolayer flakes, the following procedure may be followed. The mass and concentration of suspended flakes may be obtained by allowing the reaction vial to remain undisturbed for 1 hour after the reduction step. This ensures unsuspended flakes are sedimented. A known volume of the colloid solution may be then pipetted out and placed in a pre-weighed vial where the solvent may be removed via vacuum (e.g. acetonitrile at 200 mTorr). The measured mass and mass to colloidal solution volume represents the total mass and concentration of suspended flakes, respectively. For example, the initial concentration of $MoS_2$ in typical redox exfoliations may be 10 mg/mL. Moreover, 5-7 mg may be typically suspended in 1 ml colloidal solution, giving a suspension yield of 50-70%. The fraction of few-to-monolayer flakes may be then estimated based on centrifugal fractionation. A 1 mL aliquot from the stable colloidal solution may be centrifuged at varying RPM, and the supernatant may be examined by UV-Vis and AFM. For the TMD materials 30 examined herein, 10000 RPM provided effective separation of multilayer from few-to-monolayer flakes. After centrifugation of the aliquot at 10000 RPM, the pellet may be washed three times with ethanol to remove excess reagents (CHO, $NaBH_4$), placed in a pre-weighed vial, and dried under vacuum (300 mTorr, 60° C.). The mass reflects the amount of multilayer, suspended flakes. For the same aliquot volume, the difference between the total suspended mass and multilayer mass represents the mass of few-to-monolayer flakes. For example, the yields of few-to-monolayer $MoS_2$ are typically between 3-10%.

Characterization

XRD Analysis:

X-ray diffraction (XRD) patterns may be recorded with Cu K-alpha radiation (X=0.15418 nm). Solution XRD may be carried out by depositing 200 µL of 2 mg/mL exfoliated TMDs suspended in NMP into 1.5 mm quartz capillary tubes and measured in transmission 20 mode. After redox reactions may be complete, the TMDs may be dispersed in NMP after removal of the original solvent. Thereafter, the dispersion may be centrifuged at 1500 RPM for 45 minutes, collecting the supernatant, and concentrating the supernatant down to 200 µL. This may be performed by centrifuging the exfoliated dispersion at high speed (6000 RPM, 45 minutes) to sediment the exfoliated flakes. The solvent volume may be reduced to 200 µL, and loaded into a 1.5 mm quartz capillary tube. Thin films of TMDs may be drop casted (acetonitrile) onto $Si_{100}$ wafers and measured in θ/2θ mode.

Average crystallite thicknesses along a specific (hkl) plane may be calculated using Scherrer's equation:

$$L_{hkl} = \frac{K\lambda}{\beta \cos\theta}$$

where K is a constant related to the shape of the crystal (usually taken as 0.89), λ is the X-ray wavelength, β is the full width at half maximum intensity (FWHM), and θ is the scattering angle. The average thickness of exfoliated TMDs in solution may be determined from the c-axis crystallite size, which may be estimated using the (002) diffraction peak. The number of exfoliated layers may be obtained by dividing the average thickness by the unit cell length.

AFM Measurements:

Atomic force microscopy (AFM) of the surface morphology may be measured in tapping mode using a Dimension Icon. Standard AFM tips may be used that contained an aluminum reflex coating with a resonant frequency of 300 kHz and a force constant of 40 N/m. Lateral and height profiles may be obtained from AFM line scans of individual particles using Nanoscope Analysis software available from Bruker Corp (California, USA). Samples may be diluted in acetonitrile (approximately $1 \times 10^{-9}$M) and may be drop cast on Si wafers and allowed to dry under ambient conditions. Nanoscope Analysis software may be used to determine statistical distributions of flake thicknesses. At least 75 flakes may be analyzed for each TMD sample, and mean heights reported after removal of outliers. Line cuts of samples may be performed on representative flakes from the statistical analysis.

UV-Vis-NIR Spectroscopy:

UV-Vis spectra of exfoliated samples may be measured on a spectrometer. Absorbance measurements may be performed using the diffuse reflectance accessory for the spectrometer. Absorbance and extinction measurements may be obtained of dispersions of TMDs. Afterwards, scattering profiles may be obtained by subtracting the extinction spectra from absorbance spectra, where $Ext(\lambda)=Abs(\lambda)+Sca(\lambda)$.

Zeta Potential:

Zeta potential may be taken on dilute (O.D. 0.2-0.5) TMD dispersions in acetonitrile with a dip-cell that is compatible with organic solvent.

Electron Microscopy:

High Resolution Transmission electron microscope (HR-TEM) images may be collected on a TEM with an accelerating voltage of 300 kV. Low Resolution TEM images (LRTEM) may be collected by a TEM with an accelerating voltage of 200 kV. Scanning electron microscope (SEM) images may be collected on a SEM at an accelerating voltage of 20 kV and beam current of 20 µA.

X-Ray Photoelectron Spectroscopy (XPS):

Native silicon oxide wafers (~300 nm) may be cut into ~1 cm² pieces and cleaned by mild bath sonication in acetone. This may be followed by drying under an $N_2$ stream. TMD flakes may be drop-cast on to the wafers before washing (i.e., parent solution), and after two centrifugation/redispersion cycles. 5 µL of the supernatant may be pipetted out and drop cast onto clean Si wafers. Drop-cast samples may be allowed to dry at room temperature under $N_2$. X-ray photoelectron spectroscopic analysis may be carried out using a spectrometer under high vacuum conditions (~$2 \times 10^{-9}$ torr). Survey spectra may be acquired using a monochromated Al $K_\alpha$ x-ray source (1486.6 eV) operated at 120 W (10 mA, 12 kV) with the electron analyzer operating in hybrid lens mode and an aperture size of approximately 300 μm×700 μm. Survey data may be acquired at an analyzer pass energy of 160 eV, using 1 eV step-sizes and a dwell time of 400 ms. High-resolution data of the Mo 3d, S 2p, Se 3p regions may be collected using an analyzer pass energy of 20 eV and a step size of 0.1 eV.

Raman Spectroscopy:

Raman spectra may be collected with a Raman microscope. The excitation laser (514.5 nm) may be focused on to the few-layered flakes with a 100× objective lens (spot size 600 nm). The power may be kept to 100 μW in order to minimize sample heating. Spectra may be collected at acquisition times between 60-180 s.

FIGS. 10A through 10F, with reference to FIGS. 1A through 9, are flow diagrams illustrating a method 120 comprising providing (122) a first set of transition metal dichalcogenide particles 30 comprising a stack of at least nano-scale size platelets 35 having a chemical formula of $MX_2$, wherein M is a transition metal and X is sulfur, selenium, or tellurium; mixing (124) the first set of transition metal dichalcogenide particles (e.g., material 30) with a solvent 25 to form a slurry 20; applying (126) an oxidant 45 to the slurry 20 to form a reaction mixture comprising peroxo-metalate intermediates 50 on the platelets 35; and applying (128) a reductant (e.g., reducing agent 65) to the reaction mixture to create separated platelets 36 from the first set of transition metal dichalcogenide particles 30. The transition metal may comprise any of titanium, zirconium, hafnium, vanadium, niobium, tantalum, molybdenum, tungsten, rhenium, nickel, palladium, platinum, copper, silver, and gold.

Preferably, the oxidant 45 possesses an oxidizing potential that is thermodynamically favorable towards oxidizing the transition metal of the transition metal dichalcogenide particles (e.g., material 30). The oxidant 45 may comprise any of organic hydroperoxides (R—O—O—H) and organic peroxo-acids (R—C—$O_2$—O—H, and wherein R and R' are substituted or unsubstituted carbon-containing groups. For example, di-t-butyl peroxide or dicumyl peroxide are exemplary organic peroxides, and tert-butyl hydroperoxide (TBHP) or cumene hydroperoxide (CHP) are exemplary organic hydroperoxides. A molar ratio (mmol/mmol) of the oxidant 45 to the transition metal dichalcogenide particles (e.g., material 30) may be in the range of approximately 1/10 to 10/1. For example, the molar ratio of the oxidant 45 to the transition metal dichalcogenide particles (e.g., material 30) may be about 1/10, about 1/9, about 1/8, about 1/7, about 1/6, about 1/5, about 1/4, about 1/3, about 1/2, about 1/1, about 2/1, about 3/1, about 4/1, about 5/1, about 6/1, about 7/1, about 8/1, about 9/1, about 10/1, or in a range between any two of the foregoing.

Oxidant treatment of the slurry 20 may be achieved, for example, by portion-wise addition of the oxidant 45 to the slurry 20, while maintaining the slurry 20 at a temperature within a range from about 20° C.-100° C. As shown in FIG. 10B, the method 120 may comprise reacting (130) the slurry 20 to the oxidant 45 at approximately 0° C.-40° C., and warming (132) the reaction mixture to approximately 25° C.-75° C. As shown in FIG. 10C, the method 120 may comprise forming (134) negatively charged poly-oxo-metalates 70 from the peroxo-metalate intermediates 50 to induce separation of the platelets 35 from the first set of transition metal dichalcogenide particles 30. As shown in FIG. 10D, the method 120 may comprise providing (136) a second set of transition metal dichalcogenide particles 90; and using (148) the poly-oxo-metalates 70 to exfoliate the second set of transition metal dichalcogenide particles 90.

As shown in FIG. 10E, the method 120 may further comprise establishing (140) a predetermined threshold level of separation of the platelets 35; extracting (142) a sample of the separated platelets 36 from the reaction mixture; and comparing (144) the separation level of the sample with the predetermined threshold level. As shown in FIG. 10F, the method 120 may further comprise determining (146) the separation level of the sample using ultraviolet-visible spectrophotometry.

Figure 11:
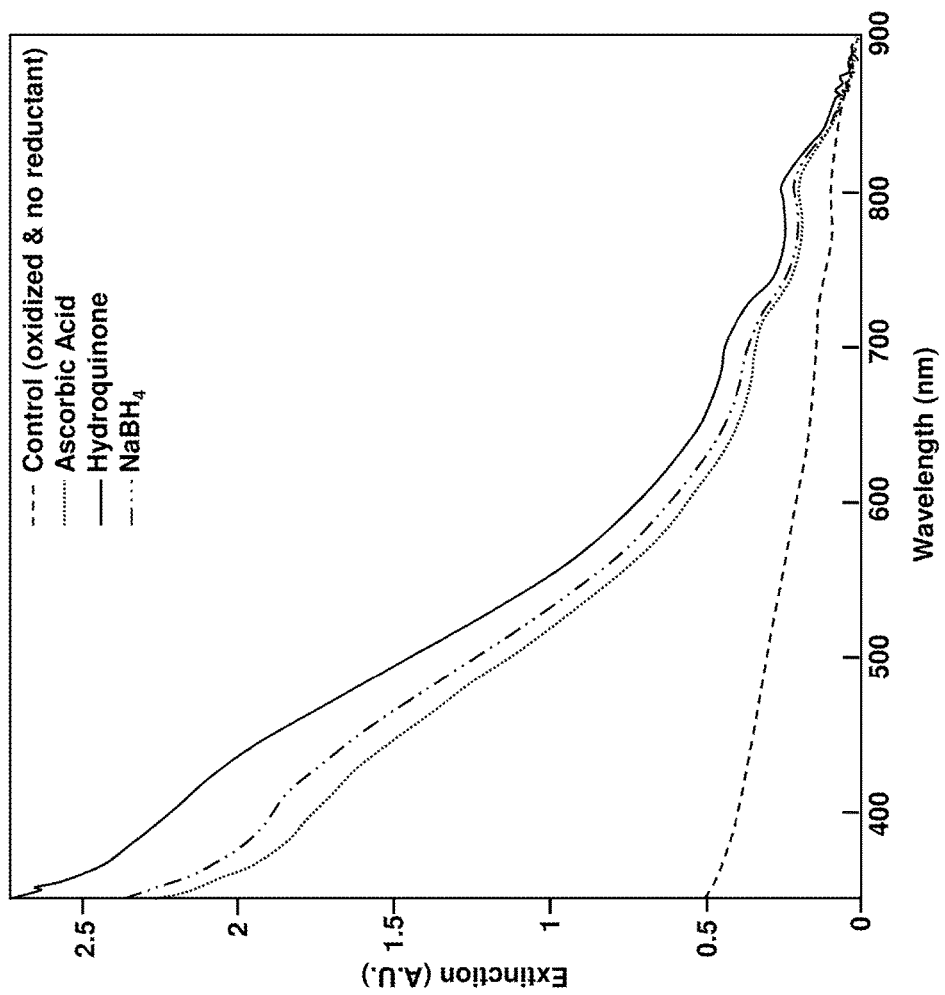
FIG. 11 illustrates UV-Vis extinction spectra for slurries containing different reductants, according to an embodiment herein.

FIG. 11, with reference to FIGS. 1A through 10F, illustrates UV-Vis extinction spectra for slurries 20 containing different reductants (e.g., reducing agents 65). The local peaks for $MoSe_2$ at 800 nm are observed for slurries 20 that are reduced (e.g., by reducing agent 65). The oxidized slurry 20 contains a minimal amount of exfoliated flakes (e.g., nano-scale platelets 36). Table 3 describes slurries containing various oxidants, reductants, and the corresponding exfoliated flake concentrations.

TABLE 3

Characteristics of various slurries

| Oxidant | Reductant (100 microliters) | Exfoliated $MoSe_2$ Concentration |
|---|---|---|
| Cumene hydroperoxide | None | 0.0125 mg/mL |
| Cumene hydroperoxide | Ascorbic acid | 0.25 mg/mL |
| Cumene hydroperoxide | Hydroquinone | 0.32 mg/mL |
| Cumene hydroperoxide | Sodium borohydride | 0.29 mg/mL |

FIG. 12, with reference to FIGS. 1A through 1I, illustrates another UV-Vis extinction spectra for slurries containing different reductants. As indicated, different hydroperoxides and peroxyacids can be used to oxidize the flakes (e.g., nano-scale platelets 36) and then reduction (e.g., by reducing agent 65) can be carried out as previously described (i.e., slow addition of $NaBH_4$). Table 4 describes slurries containing various oxidants, reductants, and the corresponding exfoliated flake concentrations.

TABLE 4

Characteristics of various slurries

| Oxidant | Reductant (100 microliters) | Exfoliated $MoSe_2$ Concentration |
|---|---|---|
| Hydrogen peroxide | Sodium borohydride | 0.015 mg/mL |
| 3-chloro perbenzoic acid | Sodium borohydride | 0.021 mg/mL |
| Cumene hydroperoxide | Sodium borohydride | 0.031 mg/mL |

The embodiments herein provide a technique for rapid exfoliation of layered TMD materials 30 by utilizing their edge-site reactivity and ability to form highly anionic polyoxometalates under quiescent, bench-top conditions. Relative to conventional LPE methods, the redox technique provided by the embodiments herein provides comparable product and yields, but accessibility to an expanded range of layered TMD materials 30 with greater efficiency (e.g., shorter processing time, reduced solvent degradation, and less energy input). Additionally, redox exfoliation is not limited to surface energy matching or addition of surfactants with the techniques provided by the embodiments herein. High quality flakes can be rapidly dispersed in polar solvents, greatly expanding the range of accessible solvents for processing and additional surface chemistry. For example, using few-to-mono layer $MoS_2$ and $WSe_2$ dispersions in ACN, bulk polymer nanocomposites may be fabricated that exhibit band-edge photo-luminesce, confirming retention of exfoliated, single TMD layers. The weakly absorbed POMs 70 can be removed with solvent washing, affording the integration of these layered TMD materials 30 into optical and electronic devices. Thus, with the increased accessibility to stable dispersions of few-to-mono layer TMD materials 30, greater integration of the unique characteristics of this class of two-dimensional materials is available into bulk forms, such as nanocomposites, coatings, and inks with unique semiconducting, semi-metallic, plasmonic, thermal, optical, and catalytic performance.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A method of exfoliating a transition metal dichalcogenide material to produce separated nano-scale platelets, the method comprising:
    combining the transition metal dichalcogenide material with a liquid to form a slurry, wherein the transition metal dichalcogenide material comprises layers of nano-scale platelets and has a general chemical formula $MX_2$, and wherein M is a transition metal and X is sulfur, selenium, or tellurium;
    treating the slurry of the transition metal dichalcogenide material with an oxidant to form peroxo-metalate intermediates on an edge region of the layers of nano-scale platelets of the transition metal dichalcogenide material; and
    treating the peroxo-metalate intermediates with a reducing agent to form negatively charged poly-oxo-metalates to induce separation of the transition metal dichalcogenide material into the separated nano-scale platelets of the transition metal dichalcogenide material.

2. The method of claim 1, wherein the transition metal comprises any of titanium, zirconium, hafnium, vanadium, niobium, tantalum, molybdenum, tungsten, rhenium, nickel, palladium, platinum, copper, silver, and gold, and wherein the chalcogenide comprises any of sulfur, selenium, and tellurium.

3. The method of claim 1, further comprising agitating the slurry by any of stirring and ultrasonicating.

4. The method of claim 1, wherein the liquid comprises an organic solvent selected from the group consisting of a polar protic solvent, a polar aprotic solvent, and combinations thereof.

5. The method of claim 4, wherein the organic solvent is selected from the group consisting of acetonitrile, methanol, ethanol, acetone, methyl ethyl ketone, N,Ndimethylformamide, N-methylpyrrolidone, and combinations thereof.

6. The method of claim 1, wherein the reducing agent comprises any of a hydride donor and an electron transfer species.

7. The method of claim 6, wherein the hydride donor comprises any of sodium borohydride and lithium borohyride, and wherein the electron transfer species comprises any of ascorbic acid and hydroquinone.

8. The method of claim 1, wherein the oxidant comprises any of peroxide and peroxo-acid.

9. The method of claim 8, wherein the peroxide comprises any of cumene hydroperoxide, hydrogen peroxide, and 3-chloroperbenzoic acid.

10. The method of claim 1, further comprising isolating the separated nano-scale platelets of the transition metal dichalcogenide material by any of decantation, centrifugation, and filtration.

* * * * *